US 6,553,756 B1

(12) United States Patent
Sealy et al.

(10) Patent No.: US 6,553,756 B1
(45) Date of Patent: Apr. 29, 2003

(54) METHOD FOR SELECTING A CYLINDER GROUP WHEN CHANGING AN ENGINE OPERATIONAL PARAMETER

(75) Inventors: Brent Edward Sealy, Dearborn, MI (US); Kenneth John Behr, Farmington Hills, MI (US); Richard Andrew Booth, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 29 days.

(21) Appl. No.: 09/785,361

(22) Filed: Feb. 16, 2001

(51) Int. Cl.⁷ .................................................. F01N 3/00
(52) U.S. Cl. ............................ 60/285; 60/274; 123/692
(58) Field of Search ......................... 60/274, 277, 285, 60/288, 299; 123/691, 692

(56) References Cited

U.S. PATENT DOCUMENTS

| | | | |
|---|---|---|---|
| 4,134,261 A | * 1/1979 | Iizuka et al. | 60/276 |
| 4,703,735 A | 11/1987 | Minamitani et al. | |
| 4,984,551 A | 1/1991 | Moser | |
| 5,074,113 A | * 12/1991 | Matsuoka | 60/276 |
| 5,233,829 A | * 8/1993 | Komatsu | 60/274 |
| 5,239,826 A | * 8/1993 | Hirota et al. | 60/302 |
| 5,279,114 A | 1/1994 | Kurita et al. | |
| 5,341,788 A | 8/1994 | Uchida | |
| 5,390,650 A | 2/1995 | Gee et al. | |
| 5,429,104 A | 7/1995 | Kondou | |
| 5,435,290 A | 7/1995 | Gopp et al. | |
| 5,450,837 A | 9/1995 | Uchikawa | |
| 5,462,038 A | 10/1995 | Kotwicki et al. | |
| 5,485,382 A | 1/1996 | Seki et al. | |
| 5,492,106 A | 2/1996 | Sharma et al. | |
| 5,511,377 A | 4/1996 | Kotwicki | |
| 5,511,378 A | 4/1996 | Lindlbauer et al. | |
| 5,570,574 A | * 11/1996 | Yamashita et al. | 123/692 |
| 5,954,039 A | 9/1999 | Doering et al. | |
| 6,237,330 B1 | * 5/2001 | Takahashi et al. | 60/285 |
| 6,324,835 B1 | * 12/2001 | Surnilla et al. | 123/443 |
| 6,347,514 B1 | * 2/2002 | Takahashi et al. | 123/692 |
| 6,354,077 B1 | * 3/2002 | Behr et al. | 60/274 |

* cited by examiner

Primary Examiner—Thomas Denion
Assistant Examiner—Diem Tran
(74) Attorney, Agent, or Firm—John F. Buckert; Allan J. Lippa

(57) ABSTRACT

A method for selecting one of first and second cylinder groups of an internal combustion engine is provided. The first and second cylinder groups are coupled with first and second catalytic converters, respectively. The method includes identifying one of the first and second catalytic converters by comparing first and second catalyst parameters, associated with the first and second catalytic converters, respectively, to one another. The first and second catalyst parameters indicate which one of the catalytic converters is more capable of maintaining reduced emissions while adjusting an engine operational parameter. The method further includes selecting one of the first and second cylinder groups coupled to the identified catalytic converter for changing an engine operational parameter in the selected cylinder group.

15 Claims, 19 Drawing Sheets

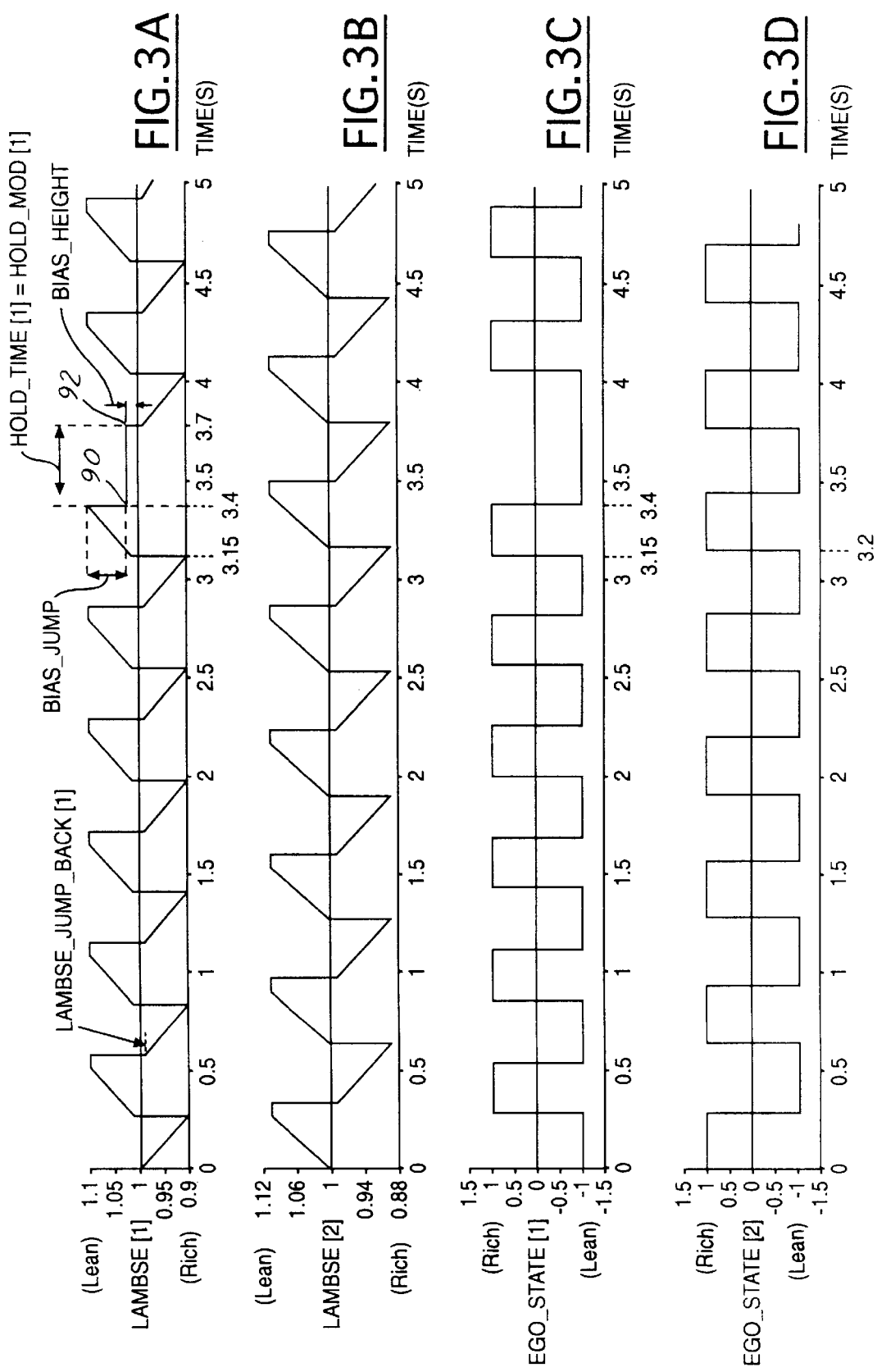

METHOD FOR SELECTING A CYLINDER GROUP WHEN CHANGING AN ENGINE OPERATIONAL PARAMETER

FIELD OF THE INVENTION

The invention relates to a method for selecting a cylinder group of an internal combustion engine when changing an engine operational parameter.

BACKGROUND OF THE INVENTION

Known internal combustion engines generally have first and second cylinder groups that are connected to either straight pipe exhaust systems or Y-pipe exhaust systems. Both types of exhaust systems further utilize catalytic converters to reduce automotive emissions.

Known engine control systems utilize a measurement of exhaust gases from the first and second cylinder groups to maintain a predetermined air/fuel ratio in each of the first and second cylinder groups. Generally, the predetermined air/fuel ratio is stoichiometric. Further, when two state exhaust gas oxygen sensors are utilized, a typical result is a fluctuation, or oscillation, of the exhaust air/fuel ratio about the predetermined air/fuel ratio.

With engines having Y-pipe exhaust systems, known control systems have attempted to maintain a desired phase difference between the first and second air/fuel ratio oscillations in the first and second cylinder groups, respectively, to reduce emissions. In particular, known control systems have attempted to phase shift one of the air/fuel ratio oscillations either in phase or out of phase with the non-shifted air/fuel ratio oscillations.

However, the known control systems and methods have not recognized and/or addressed a problem that phase shifting air/fuel ratio oscillations in one of the first and second cylinder groups may result in catalyst breakthrough in a downstream catalytic converter communicating with the shifted cylinder group. Catalyst breakthrough occurs when a catalytic converter is unable to reduce received HC, CO, and NOx emission gases.

The inventors herein have recognized that when selecting one of two cylinder groups for changing an engine operational parameter, such as a phase of air/fuel ratio oscillations, the cylinder group connected to a catalytic converter more capable of maintaining reduced emissions should be selected. In other words, the cylinder group connected to the catalytic converter less likely to have catalyst breakthrough should be selected for changing the engine operational parameter.

SUMMARY OF THE INVENTION

The invention relates to a method for selecting one of first and second cylinder groups of an internal combustion engine. In general, a cylinder group is selected that is most capable of having an engine operational parameter changed therein, without resulting in increased emissions from a downstream catalytic converter.

The method for selecting one of first and second cylinder groups of an internal combustion engine may be implemented in an engine having first and second cylinder groups coupled with first and second catalytic converters, respectively. The method includes identifying one of the first and second catalytic converters by comparing first and second catalyst parameters associated with the first and second catalytic converters, respectively. Each of the first and second catalyst parameters may include (i) a catalyst volume (ii) an amount of catalyst material, or (iii) a catalyst conversion efficiency. Catalyst parameters (with similar units) are compared to one another to determine whether one of the catalytic converters is less likely to have catalyst breakthrough when modifying an engine operational parameter therein. Finally, the method includes selecting one of the first and second cylinder groups coupled to the identified catalytic converter for changing an engine operational parameter in the selected cylinder group.

The inventive method provides a substantial advantage over known engine control methods. In particular, when an engine operational parameter is to be changed, the method selects the cylinder group (and catalytic converter) that is best capable of maintaining reduced emissions during the adjustment of the engine operational parameter.

BRIEF DESCRIPTION OF THE DRAWINGS

FIGS. 3A–3G are schematics of control signals used to phase shift air/fuel ratio oscillations in first and second cylinder groups of an internal combustion engine.

DESCRIPTION OF AN EMBODIMENT

Figure 1:
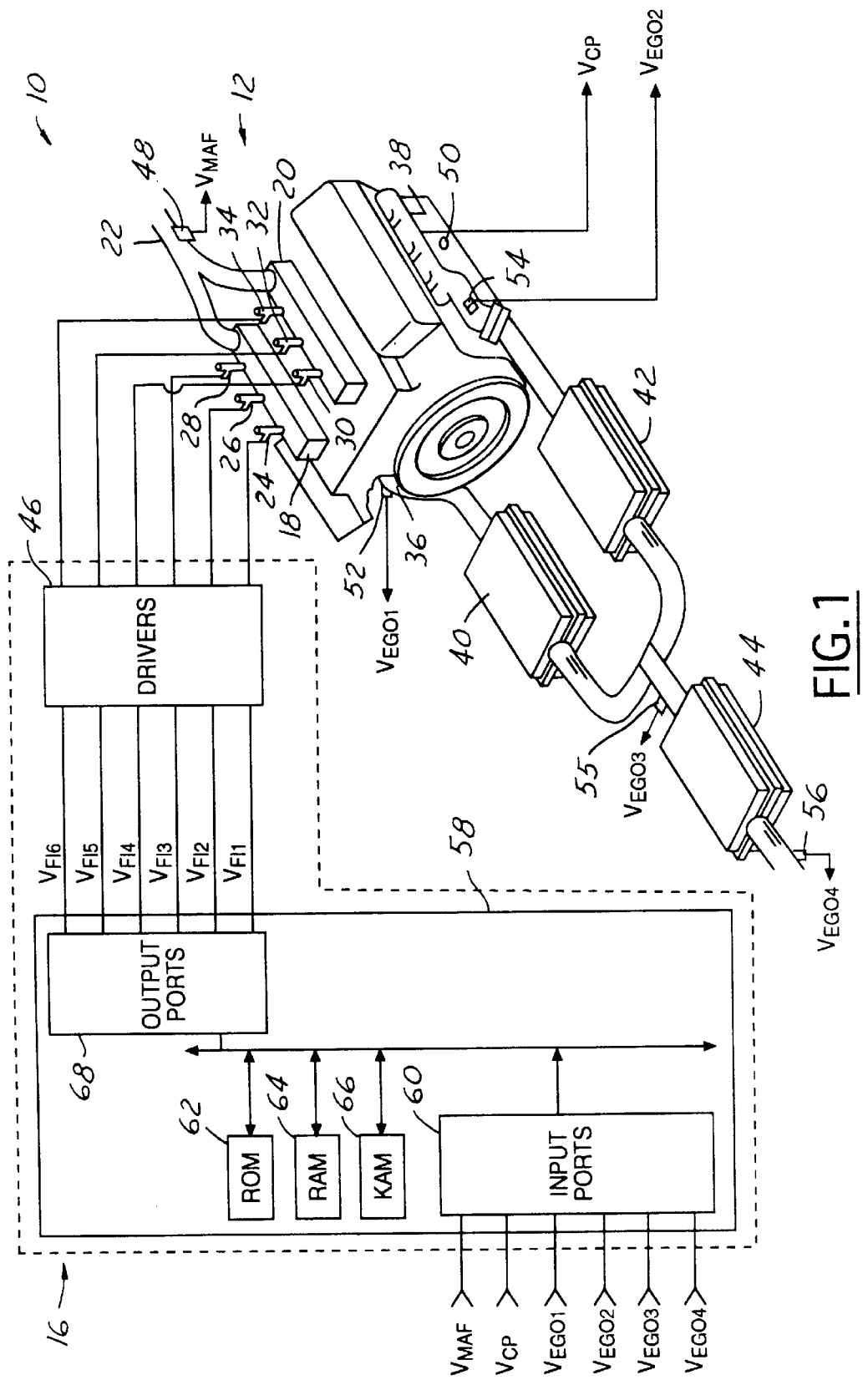
FIG. 1 is a schematic of an automotive vehicle having a control system in accordance with the present invention.

Referring now to the drawings wherein like reference numerals are used to identify identical components in the various views, FIG. 1 illustrates an automotive vehicle 10 having and an engine 12 and an engine control system 16.

The engine 12 comprises an internal combustion engine. The engine 12 includes cylinder groups 18, 20, an intake manifold 22, fuel injectors 24, 26, 28, 30, 32, 34, exhaust manifolds 36, 38, and catalytic converters 40, 42, 44.

Each of cylinder groups 18 and 20 may have one or more cylinders (not shown) wherein each cylinder receives a predetermined amount of fuel from a corresponding fuel injector. In the illustrated embodiment, each cylinder group 18, 20 includes three cylinders (not, shown). Those skilled in the. art will recognize that although a port fuel injector (PFI) system is shown, an invention claimed herein is also applicable to other fuel delivery systems such as a central fuel injection system (CFI).

The intake manifold 22 directs airflow to the cylinder groups 18, 20 of the engine 12. The configuration of the manifold 22 may vary based upon the number of cylinders of the engine 12.

The fuel injectors 24, 26, 28 provide fuel to the cylinders (not shown) in cylinder group 18 and fuel injectors 30, 32, 34 provide fuel to the cylinders in cylinder group 20. In particular, each of fuel injectors 24, 26, 28 delivers a predetermined amount of fuel to a corresponding cylinder of cylinder group 18 responsive to fuel injector control signals $V_{FI1}$, $V_{FI2}$, $V_{FI3}$ generated by the controller 58. Similarly, each of fuel injectors 30, 32, 34 delivers a predetermined amount of fuel to a corresponding cylinder of cylinder group 20 responsive to fuel injector control signals $V_{FI4}$, $V_{FI5}$, $V_{FI6}$ generated by the controller 58.

Exhaust manifolds 36, 38 directs exhaust gases from the cylinder groups 18, 20, respectively, to the catalytic converters 40, 42, respectively.

Catalytic converters 40, 42, 44 are provided to reduce undesirable byproducts of combustion of engine 12 including nitrous oxide (NOx), carbon monoxide (CO), and hydrocarbons (HC). Catalytic converters 40, 42, 44 are conventional in the art and may include three way catalysts. Although the converters 40, 42, 44 are shown in a Y-pipe configuration, it should be understood that the converters 40, 42, 44 could be configured differently. For example, a straight pipe configuration could be utilized wherein each of converters 40, 42 could be disposed between exhaust manifolds 36, 38, respectively, and separate catalytic converters.

The engine control system 16 is provided to control the engine 12. In particular, the control system 16 is provided to control the air/fuel ratio oscillations in the cylinder groups 18, 20 as will be explained in greater detail hereinbelow. The control system 16 includes a mass airflow sensor 48, a crankshaft position sensor 50, oxygen sensors 52, 54, 55, 56, engine controller 58, and drivers 46.

The mass airflow sensor 48 generates a signal $V_{MAF}$ indicative of the mass airflow in the intake manifold 22. The controller 58 receives the signal $V_{MAF}$ and derives the measured value of the mass airflow MAF from the signal $V_{MAF}$. The mass airflow MAF is indicative of engine load. The sensor 48 is conventional in the art and is disposed in the intake manifold 22. Those skilled in the art will recognize that mass airflow sensor 48 could be replaced with a manifold absolute pressure sensor to determine an engine load.

The crankshaft position sensor 50 (i.e., speed sensor) generates a crankshaft position signal $V_{CP}$ indicative of the rotational position of the crankshaft of the engine 12. The sensor 50 is conventional in the art and may comprise a Hall Effect sensor. The controller 58 receives the signal $V_{CP}$ and generates ignition control signals (not shown) responsive thereto, as known by those skilled in the art. The controller 58 may further calculate the engine speed responsive to the signal $V_{CP}$.

Oxygen sensors 52, 54, 55, 56 may comprise Heated Exhaust Gas Oxygen (HEGO Sensors). The oxygen sensors 52, 54, 55, 56 generate two-state signals $V_{EOG1}$, $V_{EOG2}$, $V_{EOG3}$, $V_{EOG4}$, respectively, that indicate whether a corresponding measured oxygen level or air/fuel ratio is either rich or lean of stoichiometry. In response to the signals $V_{EOG1}$, $V_{EOG2}$, $V_{EOG3}$, $V_{EOG4}$, the controller 58 sets the variables EGO_STATE[1], EGO_STATE[2], EGO_STATE[3], EGO_STATE[4], respectively, to either a "1" (indicating a rich state) or a "−1" (indicating a lean state). Further, it should be understood that the oxygen sensors 52, 54, 55, 56 could be proportional sensors instead of two-state sensors.

The engine controller 58 is provided to control the air/fuel oscillations in the cylinder groups 18, 20 in accordance with the present invention. The controller 58 is conventional in the art and includes inputs ports 60, read only memory (ROM) 62, random access memory (RAM) 64 for temporary data storage, keep alive memory (KAM) 66 for storing learned values, and output ports 68. As illustrated, the inputs ports 60 are electrically connected to mass air flow sensor 48, crankshaft position sensor 50, and oxygen sensors 52, 54, 55, 56 and receive signals $V_{MAF}$, $V_{CP}$, $V_{EOG1}$, $V_{EOG2}$, $V_{EOG3}$, $V_{EOG4}$ respectively. Further, the output ports 68 are coupled to the drivers 46 which receive the fuel injector control signals $V_{FI1}$, $V_{FI2}$, $V_{FI3}$, $V_{FI4}$, $V_{FI5}$, $V_{FI6}$. Each of the fuel injector control signals $V_{FI1}$, $V_{FI2}$, $V_{FI3}$ correspond to a predetermined amount of fuel $W_1$ determined by the following equation:

$$W_1 \text{MAF per cylinder}/(LAMBSE[1]*\text{Stoichiometric Constant});$$

wherein,

MAF per cylinder=cylinder air charge,

LAMBSE[1]=normalized desired air/fuel ratio for cylinder group 18,

Stoichiometric Constant=14.6 for gasoline Similarly, the fuel injector control signals $V_{FI4}$, $V_{FI5}$, $V_{FI6}$ correspond to a predetermined amount of fuel $W_2$ determined by the following equation:

$$W_2 = MAF \text{ per cylinder}/(LAMBSE[2]*\text{Stoichiometric Constant});$$

wherein,

LAMBSE[2]=normalized desired air/fuel ratio for cylinder group 20;

In response to the fuel injector control signals, the drivers 46 generate pulse width modulated signals to control the amount of fuel supplied to the cylinder groups 18, 20. The ROM 62 (i.e., computer usable medium) stores an engine control routine 93 (explained below) for implementing a method in accordance with the present invention.

Explanation of Signals and Variables Utilized to Control the Frequency of Air/fuel Ratio Oscillations in First and Second Cylinder Groups Referring to FIGS. 2A and 2C, some of the signals and variables utilized for controlling the frequency of air/fuel ratio oscillations in cylinder groups 18, 20 will now be explained. For purpose of discussion, hereinafter the signals or variables indexed with "I" are utilized for controlling either of cylinder groups 18 and 20 depending upon the whether the index "I" is set equal to "1" or "2", respectively. Further, signals and variables indexed with "1" or "2" are specifically utilized for controlling the cylinder groups 18 and 20, respectively.

The commanded air/fuel ratio signals LAMBSE[1] and LAMBSE[2] are generated by the controller 58 for controlling the air/fuel ratio in each of cylinder groups 18, 20. In particular, the signals LAMBSE[1] and LAMBSE[2] are inversely proportional in amplitude to the amount of fuel injected in the cylinder groups 18, 20, respectively. Because the signals LAMBSE[1] and LAMBSE[2] control the air/fuel ratio in each of the cylinder group 18, 20, the frequency of the signals LAMBSE[1] and LAMBSE[2] is directly indicative of the frequency of the air/fuel ratio oscillations (not shown) in the cylinder groups 18, 20, respectively. Further, the phase difference between signals LAMBSE[1] and LAMBSE[2] are directly indicative of the phase difference between air/fuel oscillations in the cylinder groups 18, 20, respectively.

Figure 2A:
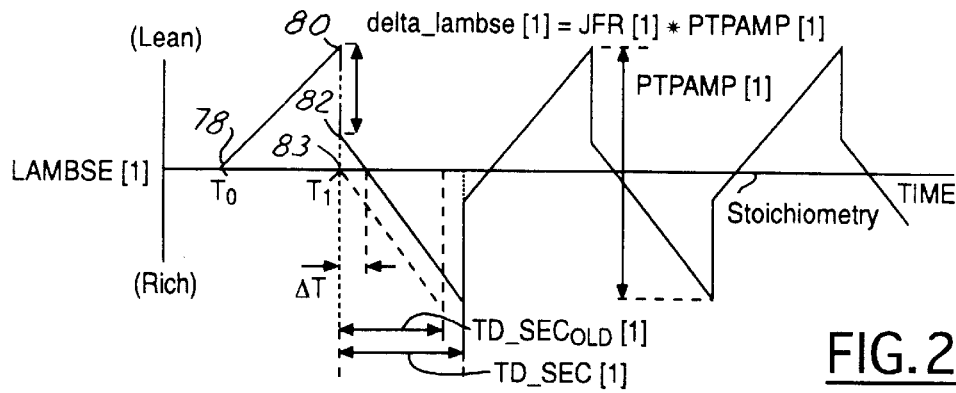
FIGS. 2A–2D are schematics of control signals for controlling the frequency of air/fuel ratio oscillations in first and second cylinder groups of an internal combustion engine.
Figure 2B:
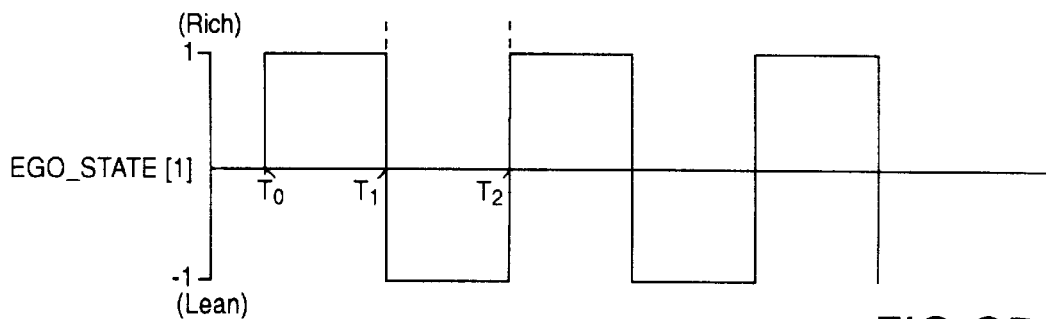
Figure 2C:
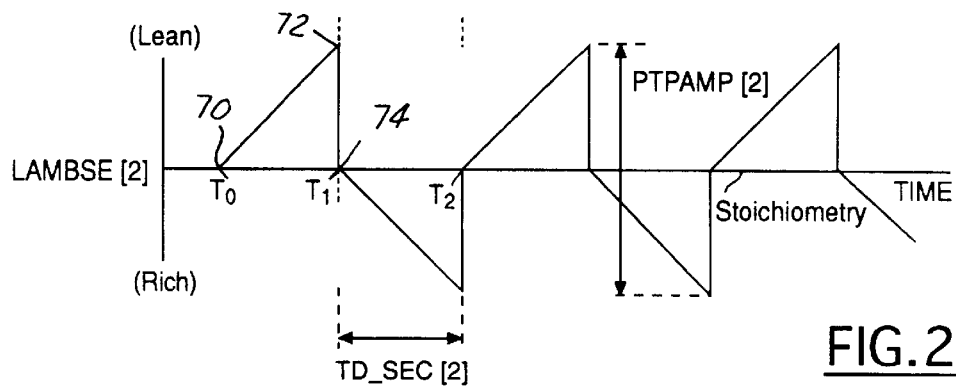
Figure 2D:
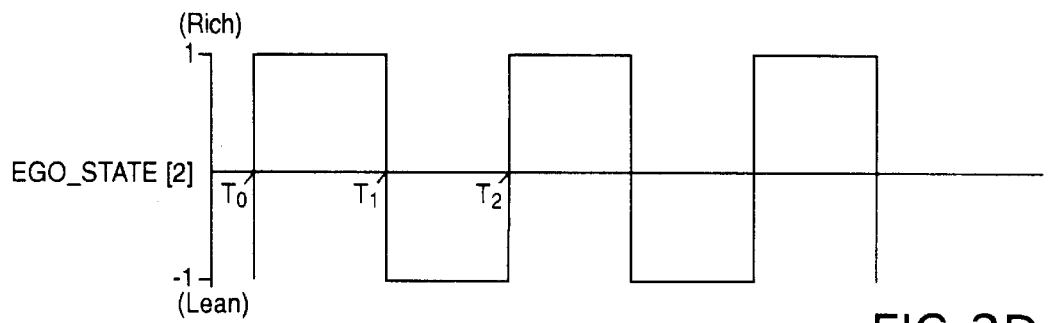

Referring to FIGS. 2B and 2D, the signals EGO_STATE[1] and EGO_STATE[2] are illustrated. As previously discussed, the signals EGO_STATE[1] and EGO_STATE[2] correspond to the current state (i.e., rich or lean) of the air/fuel ratio in the cylinder groups 18 and 20, respectively. A value of "1" indicates a rich state and a value of "−1" represents a lean state.

Referring to FIG. 2A and 2C, the values PTPAMP[1] and PTPAMP[2] represent the measured peak-to-peak amplitudes of the control signals LAMBSE[1] and LAMBSE[2], respectively. The peak-to-peak amplitudes of LAMBSE[1] and LAMBSE[2] are controlled to match desired peak-to-peak amplitudes as explained in greater detail hereinbelow.

The predetermined transport delays TD_SEC[1] and TD_SEC[2] represent the time period for which the control signals LAMBSE[1] and LAMBSE[2], respectively, are progressively altered. Further, the calculated transport delays TD_SEC[1] and TD_SEC[2] represent estimated time periods for combusted air/fuel mixtures in cylinder groups 18, 20, respectively, to travel to oxygen sensors 52, 54, respectively, and then be measured by oxygen sensors 52, 54, respectively. Thus, each transport delay TD_SEC[I] includes (i) an estimated elapsed time required for the exhaust gases to travel from a cylinder group to an oxygen sensor and (ii) an estimated response time of the oxygen sensor while measuring the oxygen level in the exhaust gases. Thus, over time, as the response time of the oxygen sensors 18, 20 begin to increase independent of one another, the transport delays TD_SEC[1] and TD_SEC[2] will begin to increase independent of one another. In known control systems, this change in the transport delays TD_SEC[1] and TD_SEC[2] results in the frequencies of the signals LAMBSE[1] AND LAMBSE[2] (and the frequencies of the air/fuel oscillations in the cylinder groups 18, 20) varying from one another.

Those skilled in the art will recognize that the predetermined transport delays TD_SEC[1] and TD_SEC[2] are indicative the frequency of the control signals LAMBSE[1] and LAMBSE[2], respectively. Further, as previously discussed, the frequency of the control signals LAMBSE[1] and LAMBSE[2] are indicative of the frequencies of the air/fuel ratio oscillations in the cylinder groups 18, 20, respectively. Thus, the transport delays TD_SEC[1] and TD_SEC[2] are also indicative of the frequencies of the air/fuel ratio oscillations in the cylinder groups 18, 20, respectively.

The signal range indicated by delta_lambse represents the proportional "jump back" toward stoichiometry of the signal LAMBSE[I]. As illustrated the value delta_lambse is calculated utilizing the equation: delta_lambse=JFR[I] *PTPAMP[I]. The value JFR[I] represents a fraction of the peak-to-peak amplitude PTPAMP[I] for determining the magnitude of the "jump back".

Overview of Control Methodology for Controlling the Frequency of Air/fuel Ration Oscillations in First and Second Cylinder Groups Referring to FIGS. 2A and 2D, a general overview the control methodology for controlling the frequency of air/fuel ratio oscillations in the cylinder groups 18, 20 will be provided.

Referring to FIG. 2C and 2D, the generation of the control signal LAMBSE[2] will now be explained. The controller 58 generates the signal LAMBSE[2] responsive to the signal EGO_STATE[2]. As previously discussed, the signal EGO_STATE[2] is indicative of the state of the air/fuel ratio in the cylinder group 20. Between times $T=T_0$ and $T=T_1$, the signal EGO_STATE[2] indicates a rich state. In response, the controller 58 ramps the control signal LAMBSE[2] upwardly to progressively move LAMBSE[2] in the lean direction with respect to stoichiometry. At time $T=T_1$, the signal EGO_STATE[2] switches to a lean state. In response, the controller 58 immediately decreases the signal LAMBSE [2] a "jump back" magnitude to achieve an air/fuel ratio having a predetermined air/fuel ratio, such as stoichiometry. The "jump back" magnitude is known as the proportional gain of the LAMBSE[I] signal. Thereafter, between times $T=T_1$ and $T=T_2$, the controller 58 ramps the control signal LAMBSE[2] downwardly to progressively move the signal LAMBSE[2] in a rich direction with respect to stoichiometry. Thus, the control signal LAMBSE[2] oscillate about the predetermined air/fuel ratio at a predetermined frequency.

Referring to FIGS. 2A and 2B, the generation of the control signal LAMBSE[1] will now be explained. For purposes of discussion, it is assumed that the control signal LAMBSE[1] was operating at a greater frequency than the signal LAMBSE[2]. As a result, the controller 58 reduces the frequency of LAMBSE[1] to match the frequency of LAMBSE[2] as explained hereinafter.

The controller 58 generates the signal LAMBSE[1] responsive to the signal EGO_STATE[1]. As previously discussed, the signal EGO_STATE[1] is indicative of the state of the air/fuel ratio in the cylinder group 18. Between times $T=T_0$ and $T=T_1$, the signal EGO_STATE[1] indicates a rich state. In response, the controller 58 ramps the control signal LAMBSE[1] upwardly to progressively move LAMBSE[1] in the lean direction with respect to stoichiometry.

At time $T=T_1$, the signal EGO_STATE[1] switches to a lean state. In response, the controller 58 immediately decreases the signal LAMBSE[1] a "jump back" magnitude to a predetermined position 82 to achieve an air/fuel ratio having a predetermined air/fuel ratio. However, the magnitude of the "jump back" to point 82 is less than that required to move the air/fuel ratio of the cylinder group 18 to predetermined air/fuel ratio (i.e., point 83) such as stoichiometry. As a result, an additional delay ΔT is added to the normal transport delay $TD\_SEC_{OLD}[1]$. Thus, the increased transport delay TD_SEC[1] results in the frequency of the control signal LAMBSE[1] being decreased to match the frequency of the signal LAMBSE[2]. As shown by the equation: frequency of LAMBSE[1]=1/(2*TD_SEC[1]), when the transport delay TD_SEC[1] is increased, the frequency of LAMBSE[1] is also reduced.

Thus, the controller 58 decreases the proportional gain (jump back) of the control signal LAMBSE[1] to decrease the frequency of LAMBSE[1] to match the lower frequency of LAMBSE[2]. Accordingly, the air/fuel ratio oscillations in the cylinder group 18 are made substantially equal to the air/fuel ratio oscillations in the cylinder group 20.

Explanation of Signals and Variables Utilized to Phase Shift Air/fuel Oscillations While Maintaining an Average Air/fuel Bias As discussed above, the inventors herein have recognized that the frequency of the air/fuel ratio oscillations in the cylinder groups 18, 20 of the engine 12 may be operating at substantially different frequencies. Further, the inventors herein have recognized that that to accurately control the phase difference between the air/fuel ratio oscillations of the cylinder groups 18, 20—the frequency of the oscillations in each of the cylinder groups 18, 20 need to be substantially equal to one another. Still further, the inventors herein have recognized, that when controlling a phase difference (i.e., phase offset) between air/fuel ratio oscillations in the cylinder groups 18, 20, it is desirable to maintain a predetermined amount of air/fuel bias in the cylinder group being phase shifted to minimize emissions.

Referring to FIGS. 3A–3F, the control signals LAMBSE[1] and LAMBSE[2] and other associated signals are shown. In accordance with the present invention, these control signals are utilized to phase shift air/fuel oscillations in one of cylinder groups 18, 20 with respect to the other cylinder group—while maintaining a predetermined amount of air/fuel bias. Further, the control system 16 may adjust the control signals LAMBSE[1] and LAMBSE[2] (and the air/fuel ratio oscillations of the cylinder groups 18, 20) to be in phase or out of phase a predetermined amount of degrees, such as 180°.

Figure 4:
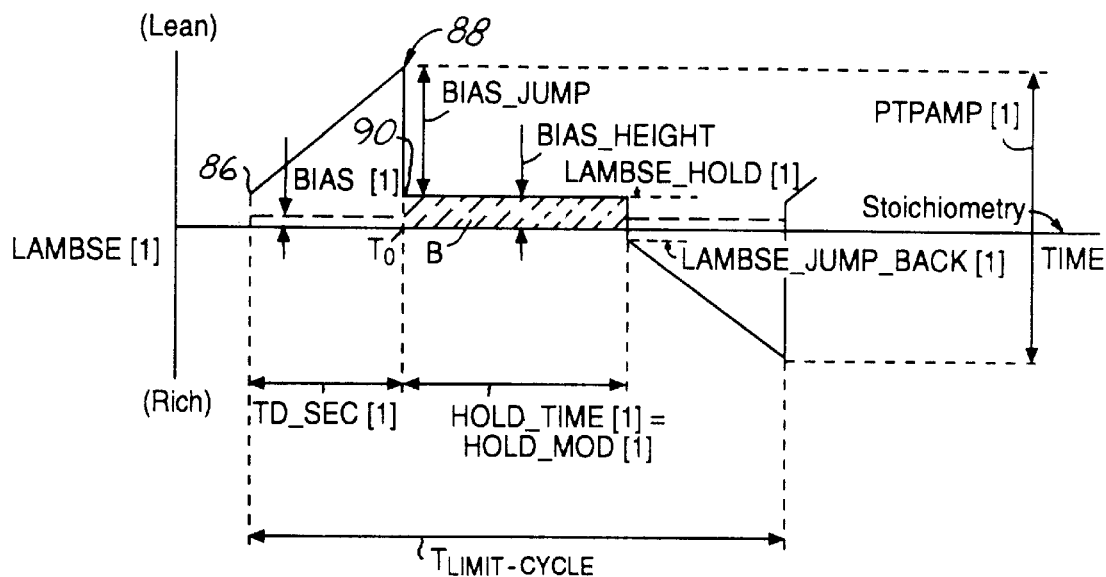
FIG. 4 is an expanded schematic of a portion of the signal illustrated in FIG. 3A.

Referring to FIG. 4, the term "air/fuel bias" will now be explained with reference to the signal LAMBSE[1], although it should be understood that an air/fuel bias may also be delivered by the signal LAMBSE[2]. The signal LAMBSE[1] delivers an air/fuel bias when the average value of LAMBSE[1] over one limit cycle interval (i.e., $T_{LIMIT\_CYLCLE}$) is either greater than or less than a target air/fuel ratio, such as a stoichiometric air/fuel ratio. If the average value of LAMBSE[1] over one limit cycle interval is greater than the target air/fuel ratio, then a lean bias (i.e., lean of the target air/fuel ratio) is being delivered to cylinder group 18. FIG. 4 illustrates lean bias delivery. Alternately, if the average value of LAMBSE[1] over one limit cycle interval is less than the target air/fuel ratio, then a rich bias (i.e., rich of the target air/fuel ratio) is being delivered to the cylinder group 18. It should be understood that an air/fuel bias can be delivered to cylinder group 18 during a phase shift of the signal LAMBSE[1] or during a non-phase shift time of LAMBSE[1]. Further, the value BIAS[1] represents the desired average air/fuel bias for cylinder group 18 for maintaining reduced emissions during variation in engine speed and engine load. Accordingly, the desired values for BIAS[1] are preferably stored in a table in the ROM of the controller 58 which is indexed by engine speed and engine load. Those skilled in the art can recognize that oxygen sensors 55, 56 additionally provide information indicative of the current operational state of the catalysts 40, 42, 44, that could be used to modify (i.e., increase or decrease) the value BIAS[I] to reduce emissions.

The value HOLD_TIME[I] represents the time interval that a LAMBSE[I] signal will be held at a constant value to deliver a predetermined amount of air/fuel bias to an associated cylinder group during a limit cycle of LAMBSE[I]. Thus, if the value HOLD_TIME[I] is greater than zero, LAMBSE[I] will be held at a constant level for the time interval HOLD_TIME[I] to deliver a desired average air/fuel bias to the corresponding cylinder group.

When phase shifting LAMBSE[I] (explained in greater detail below), the corresponding HOLD_TIME[I] is relatively large with respect to the corresponding transport delay TD_SEC[I]. For example, referring to FIG. 4, the value HOLD_TIME[1] is relatively large with respect to the corresponding TD_SEC[1]. In particular, when phase shifting LAMBSE[I], the value HOLD_TIME[I] may be up to twice as large as the value TD_SEC[I].

Alternately, when LAMBSE[I] is not being phase shifted, the corresponding HOLD_TIME[I] is relatively small with respect to the corresponding TD_SEC[I]. For example, referring to FIG. 5D, the value HOLD_TIME[2] is relatively small with respect to the corresponding transport delay TD_SEC[2]. In particular, when LAMBSE[I] is not being phase shifted, the value HOLD_TIME[I] may be less than 10% of the value TD_SEC[I].

The value HOLD_MOD[I] represents the amount of time needed to bring one of the signals LAMBSE[I] to a desired phase difference with respect to the other signal LAMBSE[I]. Thus, when the value HOLD_TIME[I] is set equal to HOLD_MOD[I], the signal LAMBSE[I] is held for the time interval HOLD_MOD[I] to phase shift the respective signal LAMBSE[I] while maintaining an average air/fuel bias.

Figure 3E:
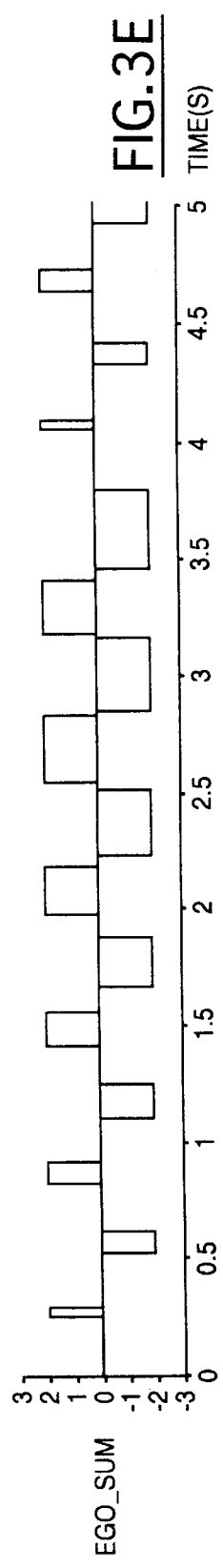

The signal range indicated by BIAS_HEIGHT corresponds to the difference in the air/fuel ratio for a period of time indicated by HOLD_TIME[I] and the air/fuel ratio required to achieve a stoichiometric air/fuel ratio. The area B defined by BIAS_HEIGHT*HOLD_TIME[I] (shown in dashed lines in FIG. 4) represents the amount of air/fuel bias delivered during a limit cycle of LAMBSE[I]. The area B is equal to the area defined by the average air/fuel bias (i.e., BIAS[I]) over one limit cycle of LAMBSE[I]. Referring to FIG. 3E, the signal EGO_SUM is the sum of the signals EGO_STATE[1] and EGO_STATE[2] and is indicative of whether the signals EGO_STATE[1] and EGO_STATE[2] are in phase or out of phase with one another. For example, when the signal EGO_SUM is equal to a zero value, the signals EGO_STATE[1] and EGO_STATE[2] are out of phase of each other. Alternately, when the signal EGO_SUM is equal to a non-zero value, the signals EGO_STATE[1] and EGO_STATE[2] are in phase with each other. It should be understood that the signal EGO_SUM is further indicative of whether the air/fuel ratio oscillations in cylinder groups 18, 20 are in phase or out of phase with one another.

Figure 3F:
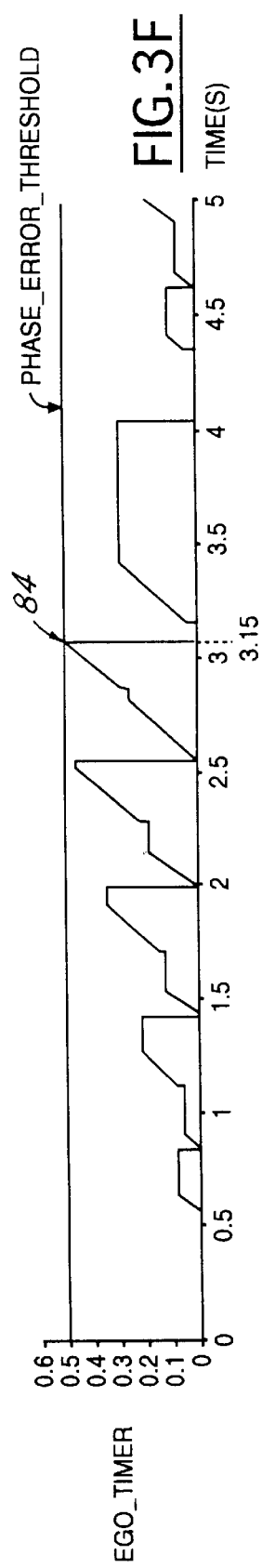

Referring to FIG. 3F, the signal EGO_TIMER represents the amount of time that the signals EGO_STATE[1] and EGO_STATE[2] are in the incorrect phase with respect to one another. It should be understood, that the value of EGO_TIMER is further indicative of the amount of time that the air/fuel ratio oscillations in the cylinder groups 18, 20 are in the incorrect phase with respect to one another. When in phase operation is desired, the value of EGO_TIMER corresponds to the amount of time that the signals EGO_STATE[1] and EGO_STATE[2] are out of phase during a limit cycle of EGO_STATE[1]. Thus, the value of EGO_TIMER is incremented when the signals EGO_STATE[1] and EGO_STATE[2] are out of phase of one another. Alternately, when out of phase operation is desired, the value of EGO_TIMER corresponds to the amount of time that the signals EGO_STATE[1] and EGO_STATE[2] are in phase of one another. Thus, in this case, the value of EGO_TIMER is incremented when the signals EGO_STATE[1] and EGO_STATE[2] are in phase of one another.

Referring to FIG. 3F at point 84, when the signal EGO_TIMER is greater than a PHASE_ERROR_THRESHOLD value, the controller 58 sets a software flag to phase shift one of the LAMBSE[I] signals. The PHASE_ERROR_THRESHOLD value may be set equal to the value TD_SEC[1]. The value of EGO_TIMER is reset to zero after each limit cycle of EGO_STATE[1] on a positive transition of the signal EGO_STATE[1] to a rich state. However, it should be understood that in an alternate embodiment, EGO_TIMER could be reset based on the signal EGO_STATE[2].

Figure 3G:
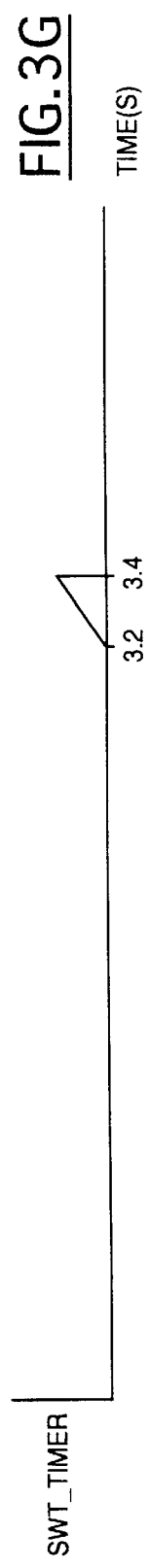

Referring to FIG. 3G, the timer SWT_TIMER represents the amount of time that the signals EGO_STATE[1] and EGO_STATE[2] are out of phase of one another. The timer SWT_TIMER will be discussed in greater detail hereinbelow.

Overview of Control Methodology for Phase Shifting Air/fuel Oscillations While Maintaining an Average Air/fuel Bias Referring to FIGS. 3A and 3B, the control methodology for phase shifting one of the control of signals LAMBSE[1]

and LAMBSE[2] with respect to the other while maintaining an average air/fuel bias will be explained. As a result, one of the air/fuel ratio oscillations in the cylinder groups 18, 20 is phase shifted with respect to the non-shifted cylinder group. For purposes of discussion, it is presumed that an out of phase relationship is desired between the control signals LAMBSE[1] and LAMBSE[2]. Further it is presumed that the signal LAMBSE[1] is to be phase shifted with respect to the signal LAMBSE[2].

Referring to FIGS. 3C and 3F, at time T=3.15 seconds, when the signal EGO_STATE[1] transitions from a lean to a rich state, the signal EGO_TIMER is greater than the value PHASE_ERROR_THRESHOLD. The signal EGO_TIMER is greater than the value PHASE_ERROR_THRESHOLD when the signals EGO_STATE[1] and EGO_STATE[2] are in the incorrect phase (with respect to one another) greater than a desired amount of time during a limit cycle of EGO_STATE[1]. In response, the controller 58 sets a flag DETERMINE_PHASE_DIFF_FLAG equal to "1" which indicates that a phase shift will occur during a subsequent iteration/call of the engine control routine 93 (explained below).

After the EGO_STATE[1] switches to a rich state at time T=3.15 seconds, the controller 58 monitors the signal EGO_STATE[I] associated with the LAMBSE[I] signal not being switched, for a switch of state. In other words, the controller 58 monitors the signal EGO_STATE[2] for a transition from lean to rich, or vice versa. Referring to FIG. 3D at time T=3.2 seconds, the signal EGO_STATE[2] switches state.

Referring to FIG. 3G, in response to the EGO_STATE[2] signal switching state, the controller 58 increments a timer SWT_TIMER until the EGO_STATE[I] associated with the signal LAMBSE[I] being phase shifted switches state. In other words, the controller 58 increments the timer SWT_TIMER until the EGO_STATE[1] switches state. Referring to FIG. 3C at time T=3.4 seconds, the signal EGO_STATE [1] switches state and the timer SWT_TIMER is stopped. Thus, the timer SWT_TIMER represents the time difference (i.e., phase difference) between the signals EGO_STATE[1] and EGO_STATE[2] (and the signals LAMBSE [1] and LAMBSE[2]). In this example, the value of SWT_TIMER equals 3.4 seconds minus 3.2 seconds, or 0.2 seconds.

Thereafter, the controller 58 utilizes the value of SWT_TIMER to calculate the time HOLD_MOD[1] for phase shifting the signal LAMBSE[1] a predetermined amount from the signal LAMBSE[2]. Further, the controller 58 calculates the value BIAS_JUMP which represents the magnitude of the "jump back" of the LAMBSE[1] signal deliver a desired amount of air/fuel bias to the cylinder group 18 over the time interval HOLD_MOD[1].

Referring to FIG. 3A at time T=3.4 seconds, in response to the signal EGO_STATE[1] switching to a lean state, the controller 58 immediately decreases the control signal LAMBSE[1] by the value BIAS_JUMP. Thereafter, during the time interval HOLD_TIME[1]=HOLD_MOD[1], the controller 58 holds LAMBSE[1] at a constant value to phase shift the signal LAMBSE1[ ] with respect to the signal LAMBSE[2].

Referring to FIGS. 3A and 3B, at time T=3.7 seconds, both the control signals LAMBSE[1] and LAMBSE[2] are out of phase as desired. Thus, the air/fuel ratio oscillations in cylinder groups 18, 20 are also out of phase with respect to one another as desired. Further, during the phase shift of the control signal LAMBSE[1], a predetermined amount of bias is delivered to the cylinder group 18. Referring to FIG. 4, in particular, the predetermined amount of air/fuel bias delivered during the time interval HOLD_TIME[1]=HOLD_MOD[1] is equal to desired average air/fuel bias (i.e., BIAS[1]) for each limit cycle of LAMBSE[1].

Method for Controlling First and Second Cylinder Groups of an Internal Combustion Engine The controller 58 operates in accordance with a software program stored in the ROM 62 which implements a method of controlling an internal combustion engine in accordance with the present invention. FIG. 9A illustrates the engine control routine 93 that is utilized to control the engine 12. The engine control routine 93 generates the signals LAMBSE[1] and LAMBSE[2] to (i) match the frequencies of the air/fuel ratio oscillations in the cylinder groups 18, 20, and (ii) to control the phase difference between the air/fuel ratio oscillations in the cylinder groups 18, 20 while maintaining an average air/fuel bias in the shifted cylinder group. FIGS. 9B–9M illustrate subroutines called by the engine control routine 93 and/or other subroutines.

The engine control routine 93 is preferably executed as a portion of a closed-loop fuel routine (not shown). The routine 93 is preferably iteratively called by the closed-loop fuel routine to control the air/fuel mixture of the cylinder groups 18, 20, one at a time. Further, when the routine 93 is called to control the cylinder group 18, the index "I" used in various variables of the routine 93 is set equal to "1". Similarly, when the routine 93 is called to control the cylinder group 20, the index "I" is set equal to "2".

Because the engine control routine is called to control the cylinder group 18 (using LAMBSE[1]) during a first time interval/iteration and is then called in a subsequent time interval/iteration to control the cylinder group 20 (using LAMBSE[2]), only the control of the cylinder group 18 will be discussed in detail hereinafter. Thus, unless specified otherwise, whenever an index "I" is utilized in the flowchart, we will assume the index "I" is set equal to "1" for purposes of discussion.

Further, the signals EGO_STATE[I] and the EGO_SWITCH[I] are determined before the start of each iteration of the routine 93. The value EGO_SWITCH[I] indicates whether the signal EGO_STATE[I] changed state since the past iteration of the routine 93. When the EGO_STATE[I] changed state, EGO_SWITCH[I] equals "1". Otherwise, EGO_SWITCH[I] equals "0".

The engine control routine 93 is entered at step 94 which determines if closed loop control of the engine 12 is desired. If closed loop control is desired, the step 96 determines if out of phase operation is desired. Otherwise, the routine 93 is exited and control is passed to the closed-loop fuel routine (not shown). Those skilled in the art will recognize that the cylinder groups 18, 20 of engine 12 may be operated in phase of one another when optimal catalytic converter efficiency is required. Alternately, cylinder groups 18, 20 may be operated out of phase of one another when the engine 12 is operated at low speeds to minimize noise and vibrations of the engine 12. If out of phase operation is desired, step 98 sets a BANK_PHASING flag equal to "–1." Otherwise, step 100 sets the BANK_PHASING flag equal to "1" indicating in phase operation is desired.

At step 102, the state of the flag DETERMINE_PHASE_DIFF_FLAG is checked to determine whether the one of the signals LAMBSE[1] and LAMBSE[2] should be phase shifted to maintain a desired phase difference between the signals. If the flag DETERMINE_PHASE_DIFF_

FLAG is equal to "1", the step 104 calls the determine phase difference subroutine 119. The flag DETERMINE_PHASE_DIFF_FLAG will only be set equal to "1" when (i) the frequencies of the signals LAMBSE[1] and LAMBSE[2] are substantially equal to one another and (ii) the signals LAMBSE[1] and LAMBSE[2] are in an incorrect phase with respect to one another, greater than a predetermined amount of time.

Figure 9F:
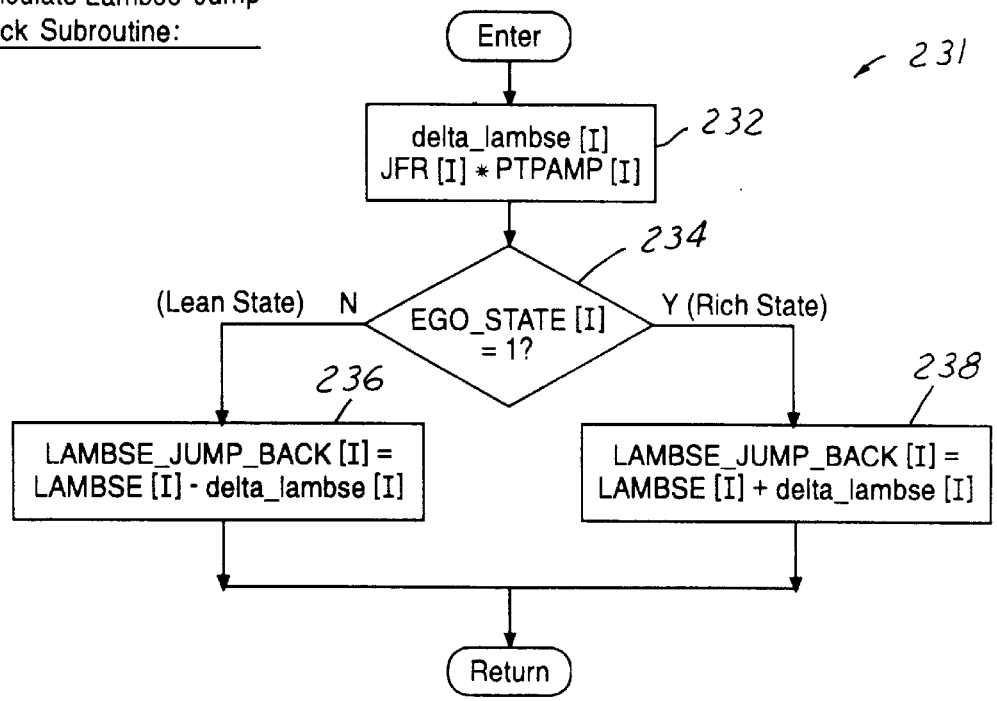
FIGS. 9A–9M is a flowchart illustrating a method for controlling the air/fuel ratio oscillations in first and second cylinder groups of an internal combustion engine.
Figure 9A:
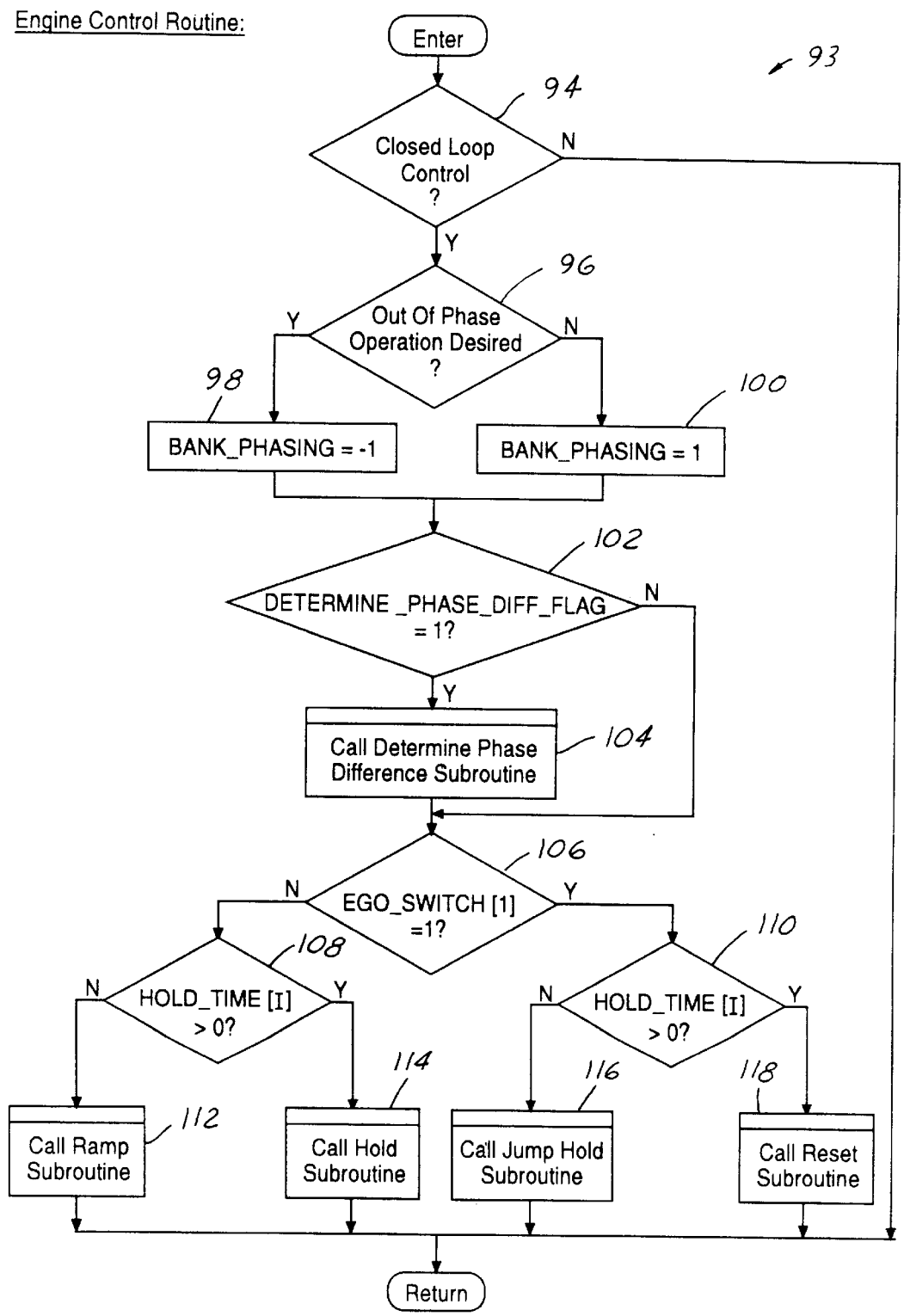
Figure 9B:
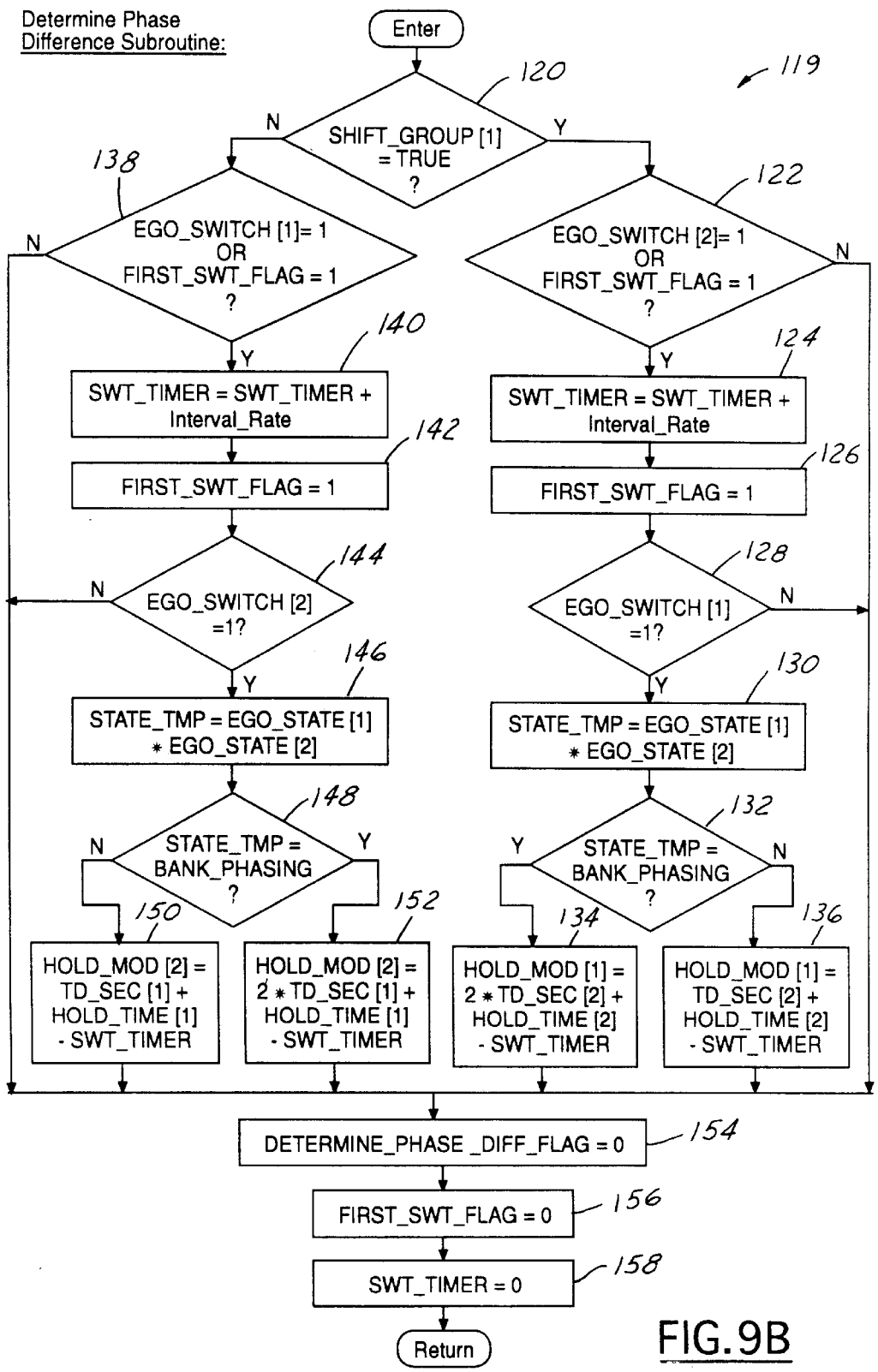

Referring to FIG. 9B, the determine phase difference subroutine 119 will be explained. The subroutine 119 determines a time difference (i.e. phase difference) between the signals LAMBSE[1] and LAMBSE[2] utilizing the timer SWT_TIMER. The routine 119 utilizes the value of SWT_TIMER to calculate a HOLD_MOD[1] value which represents the amount of time that the signal LAMBSE[1] will be phase shifted. Further, the subroutine 119 will be called more than once (i.e., called over multiple iterations of the engine control routine 93) to determine the value of HOLD_MOD[1], as will be explained in greater detail below.

The routine 119 is entered at step 120 which checks the value SHIFT_GROUP[1]. If the value SHIFT_GROUP[1] equals TRUE, the signal LAMBSE[1] (and air/fuel ratio oscillations in cylinder group 18) are to be phase shifted. The determination of the value SHIFT_GROUP[1] will be explained in greater detail below. Next, the step 122 determines whether value EGO_STATE[2] switched states during the past iteration of the routine 93 (i.e., EGO_SWITCH[2]=1). It should be noted that when the signal EGO_STATE[2] switches states, the timer SWT_TIMER will be started. If the signal EGO_STATE[2] did not switch states and the FIRST_SWT_FLAG equals a "0", the routine 119 is exited and the routine 93 advances to the step 106. Otherwise, the value of SWT_TIMER is incremented (step 124) and the pass through flag FIRST_SWT_FLAG is set equal to "1" (step 126). The flag FIRST_SWT_FLAG allows the routine 119 to automatically advance from step 122 to step 124 during subsequent calls of the routine 119 to increment the timer SWT_TIMER—until the flag FIRST_SWT_FLAG is reset when the value HOLD_MOD[1] is successfully calculated.

At step 128, the value of EGO_SWITCH[1] is checked to determine if the EGO_SWITCH[1] has changed state. If the EGO_SWITCH[1] did not switch state, the subroutine 119 is exited and the routine 93 advances to the step 106. Otherwise, at step 130, the value STATE_TEMP is determined by the equation:

STATE_TMP=EGO_STATE[1]*EGO_STATE[2] The value STATE_TMP is indicative of whether the signals EGO_STATE[1] and EGO_STATE[2] (and the signals LAMBSE[1] and LAMBSE[2]) are currently in phase or out of phase. For example, if the value of STATE_TEMP equals "−1" the signals are out of phase. If the value of STATE_TMP equals "1", the signals are in phase. Thus one skilled in the art will recognize that the subroutine 119 is checking for a switch of states EGO_STATE[1] associated with the signal LAMBSE[1] being phase shifted, before stopping the SWT_TIMER and calculating the value HOLD_MOD[1].

At step 132, the value STATE_TEMP is compared to the value BANK_PHASING to determine whether both values are equal to one another. If the value of STATE_TEMP equals the value BANK_PHASING, the value of HOLD_MOD[1] is calculated at step 134 utilizing the equation:

$$\text{HOLD\_MOD}[1] = (2*TD\_\text{SEC}[2]) + \text{HOLD\_TIME}[2] - SWT\_\text{TIMER}$$

Figure 5A:
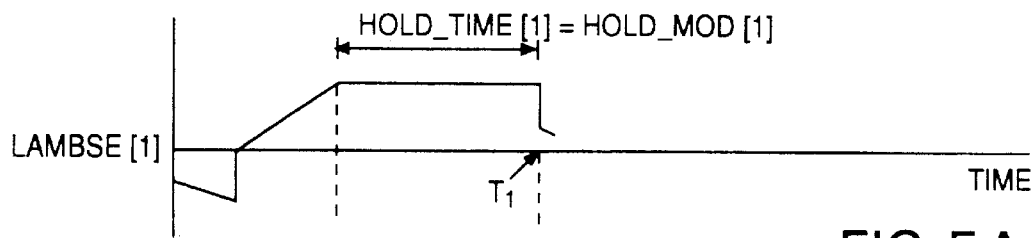
FIGS. 5A–5E, 6A–6E, 7A–7E, and 8A–8E are signal schematics showing four possible phase shift conditions for first and second cylinder groups of an internal combustion engine.
Figure 5B:
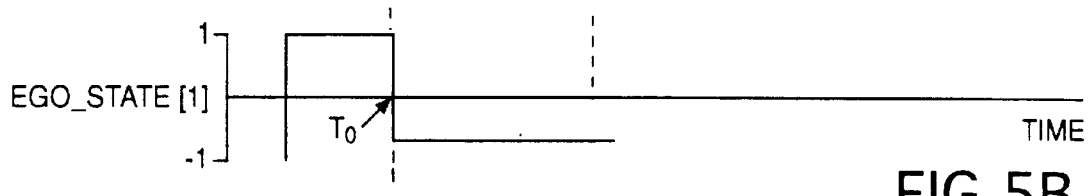
Figure 5C:
Figure 5D:
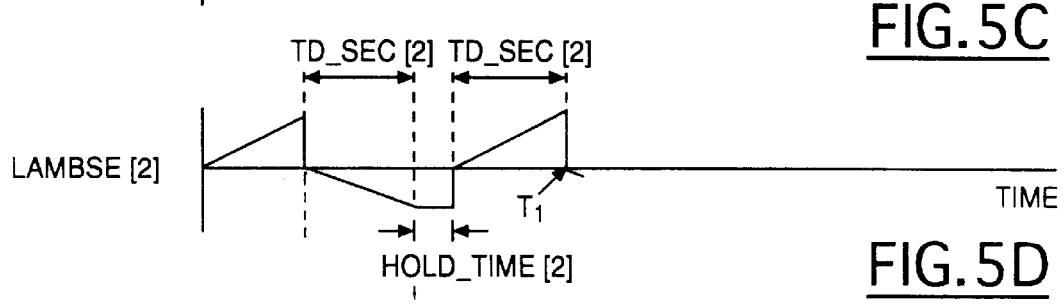
Figure 5E:
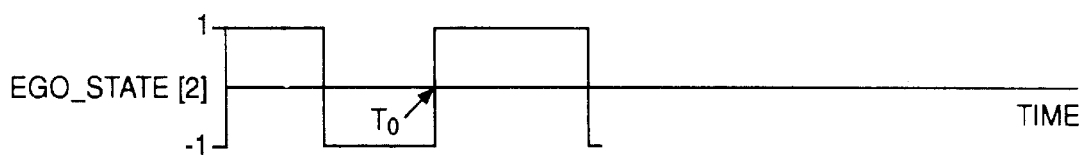

Referring to FIGS. 5B and 5E, for example, at time $T=T_0$ the value of STATE_TMP (STATE_TMP=−1* −1) equals "1". Further, when in phase operation is desired, the value BANK_PHASING equals "1". Accordingly, the value STATE_TMP equals the value BANK_PHASING (step 132) and the calculated value HOLD_MOD[1] (step 134) is the time interval required for phase shifting the signal LAMBSE[1] in phase with the signal LAMBSE[2].

Referring to FIG. 9B, at step 132, if the STATE_TMP is not equal to the value BANK_PHASING, the value of HOLD_MOD[1] is calculated at step 136 utilizing the equation:

$$\text{HOLD\_MOD}[1] = TD\_\text{SEC}[2] + \text{HOLD\_TIME}[2] SWT\_\text{TIMER}$$

Figure 6A:
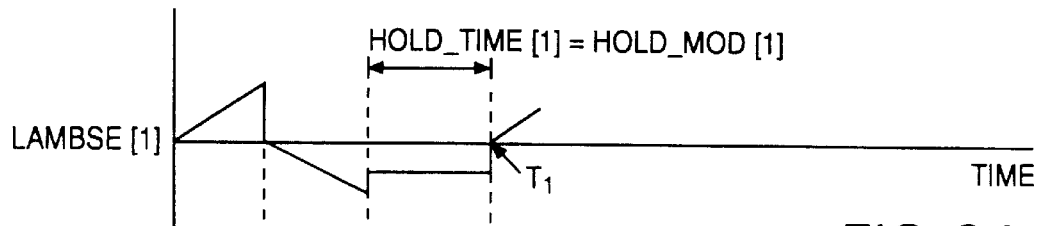
Figure 6B:
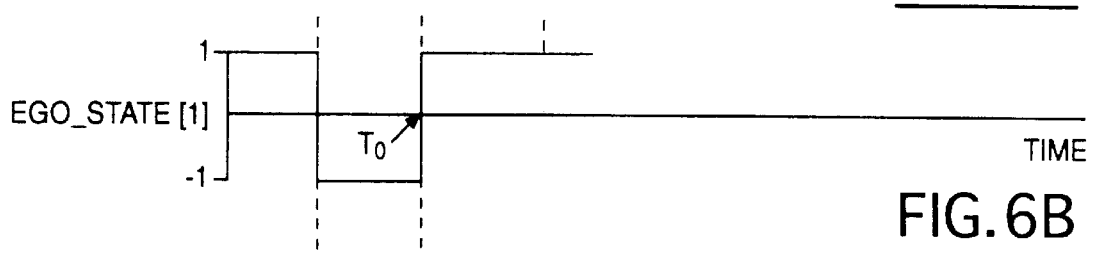
Figure 6C:
Figure 6D:
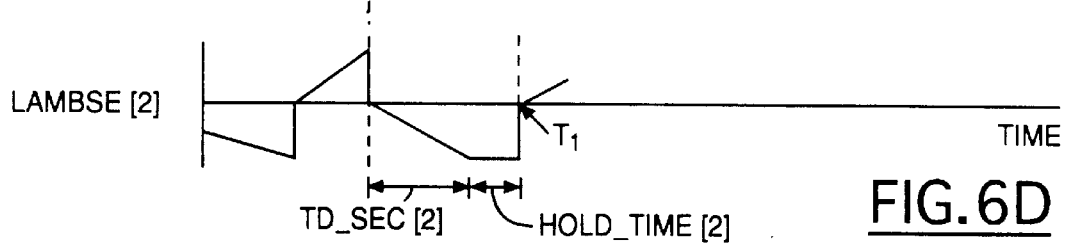
Figure 6E:
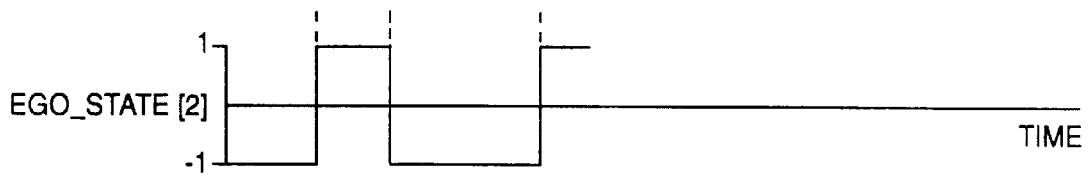

Referring to FIGS. 6B and 6E, for example, at time $T=T_0$ the value STATE_TMP (STATE_TMP=1*−1) equals "−1." Further, when in phase operation is desired, the value of BANK_PHASING equals "1". Accordingly, the value STATE_TMP is not equal to the value BANK_PHASING (step 132) and the calculated value HOLD_MOD[1] (step 136) is the time interval required for phase shifting the signal LAMBSE[1] in phase with the signal LAMBSE[2].

Referring to FIG. 9B, at step 120, if the value SHIFT_GROUP[1] equals FALSE indicating the signal LAMBSE[2] (and air/fuel ratio oscillations in cylinder group 20) are to be phase shifted, the step 138 determines whether the signal EGO_STATE[1] has switched states (i.e., EGO_SWITCH[1]=1). It should be noted that when the signal EGO_STATE[1] switches states, the timer SWT_TIMER will be started. If the signal EGO_STATE[1] did not switch states and the value FIRST_SW_FLAG is not equal to "1", the subroutine 119 is exited and the routine 93 advances to the step 106. Otherwise, the value of SWT_TIMER is incremented (step 140) and the pass through flag FIRST_SWT_FLAG is set equal to "1" (step 142).

At step 144, the value EGO_SWITCH[2] is checked to determine if the signal EGO_STATE[2] changed state. If the value EGO_STATE[2] did not change state, then the routine 119 is exited. Alternately, the subroutine 119 advances to the step 146 which calculates the value STATE_TEMP.

At step 148, the value STATE_TEMP is compared to the value BANK_PHASING to determine whether both values are equal to one another. If the value STATE_TEMP 148 equals the value BANK_PHASING, the value of HOLD_MOD[2] is calculated at step 152 utilizing the equation:

$$\text{HOLD\_MOD}[2] = (2*TD\_\text{SEC}[1]) + \text{HOLD\_TIME}[1] - SWT\_\text{TIMER}$$

Figure 7A:
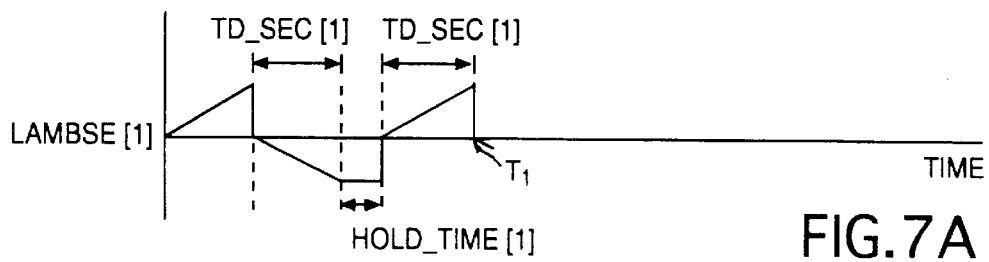
Figure 7B:
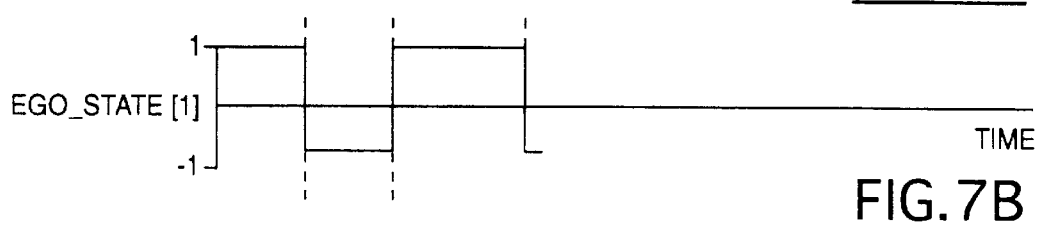
Figure 7C:
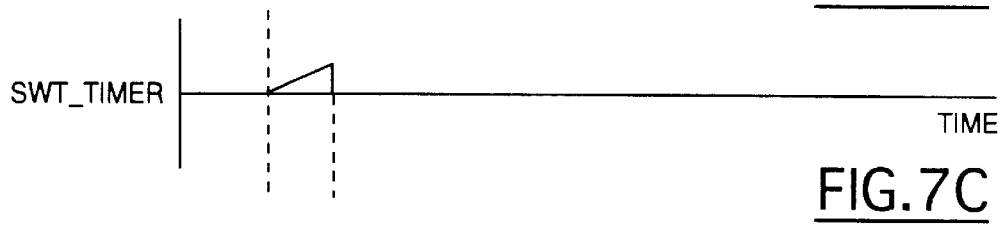
Figure 7D:
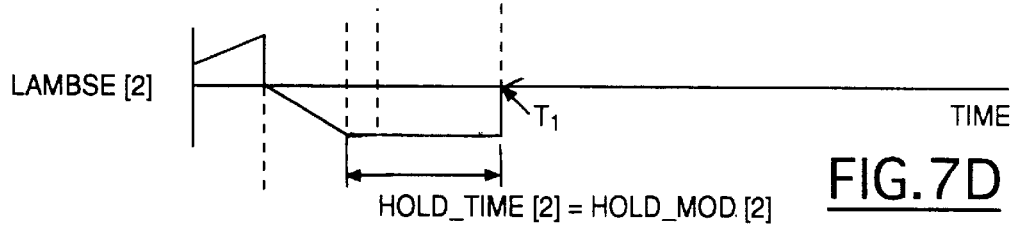
Figure 7E:
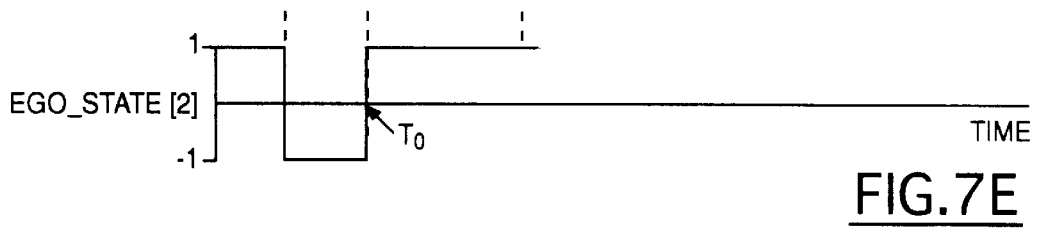

Referring to FIGS. 7B and 7E, for example, at time $T=T_0$ the value of STATE_TMP (STATE_TMP=−1*1) equals "−1". Further, when out of phase operation is desired, the value of BANK_PHASING equals "−1". Accordingly, value STATE_TEMP 148 equals the value BANK_PHASING (step 148) and the calculated value HOLD_MOD[2] (step 152) is the time interval required for phase shifting the signal LAMBSE[2] out of phase with the signal LAMBSE[1].

Referring to FIG. 9B, at step 148, if the value STATE_TEMP 148 is not equal to the value BANK_PHASING, the value of HOLD_MOD[2] is calculated at step 150 utilizing the equation:

$$\text{HOLD\_MOD}[2] = TD\_\text{SEC}[1] + \text{HOLD\_TIME}[1] - SWT\_\text{TIMER}$$

Figure 8A:
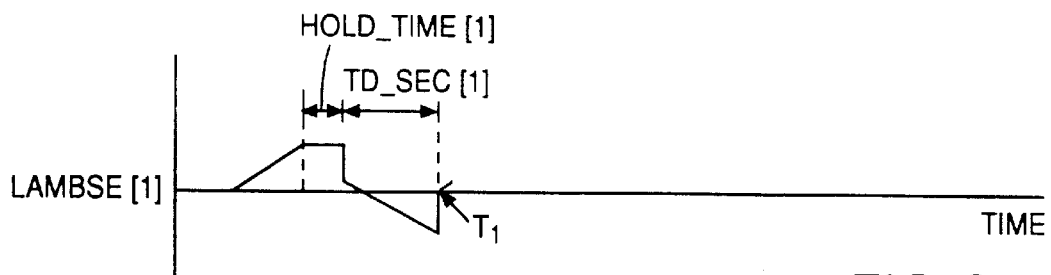
Figure 8B:
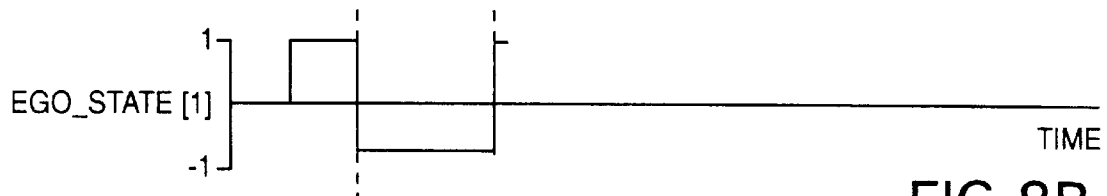
Figure 8C:
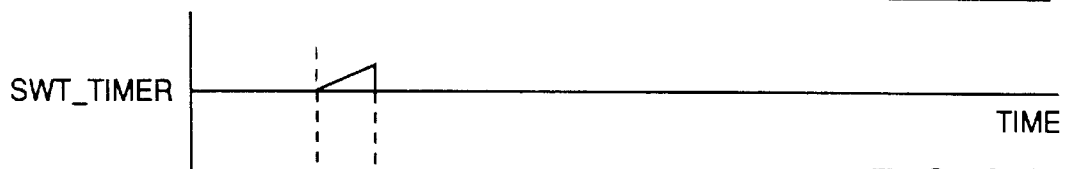
Figure 8D:
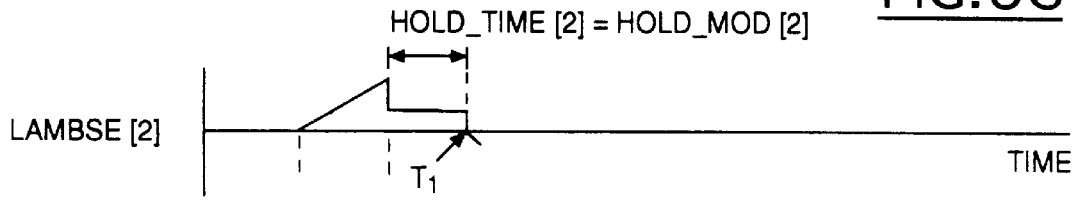
Figure 8E:
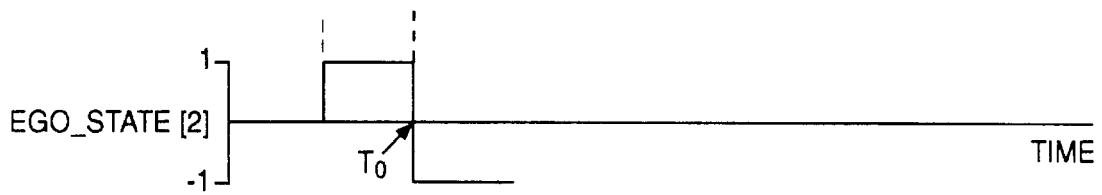

Referring to FIGS. 8B and 8E, for example, at time $T=T_0$ the value of STATE_TMP (STATE_TMP=−1*−1) equals "1." Further, when out of phase operation is desired, the value of BANK_PHASING equals "−1". Accordingly, the value STATE_TEMP 148 is not equal to the value BANK_PHASING (step 148) and the calculated value HOLD_MOD[2] (step 150) is the time interval required for phase shifting the signal LAMBSE[2] out of phase with the signal LAMBSE[1].

After any of the steps 134, 136, 150, 152, the subroutine 119 re-initializes the variables DETERMINE_PHASE_DIFF_FLAG (step 154), FIRST_SWT_FLAG (step 156), and SWT_TIMER (step 158). Thereafter, the subroutine 119 is exited and the routine 93 advances to the step 106 illustrated in FIG. 9A.

As noted above, it may take several iterations of the engine control routine 93 which calls the subroutine 119 before the conditions at steps 122, 128 or steps 138, 146 are satisfied, allowing for the calculation of HOLD_MOD[I]. As previously discussed, the value HOLD_MOD[I] determines the time interval required to phase shift the signal LAMBSE[I] a desired amount with respect to the other signal LAMBSE[I]. Thus, even if a phase shift is desired during a specific iteration of the routine 93, the routine 93 waits until the value HOLD_MOD[I] is calculated before commencing a phase shift of LAMBSE[1].

Referring to FIG. 9A, at step 106, the value EGO_SWITCH[1] is checked to determine whether signal EGO_STATE[1] switched state. If the EGO_STATE[1] changed state (step 106), and the value HOLD_TIME[1] indicates that air/fuel bias is being delivered by LAMBSE[1] (step 110), an error condition has occurred. Accordingly, the step 114 calls the reset subroutine 355 which is explained in greater detail hereinafter.

Alternately, if the signal EGO_STATE[1] changed state (step 106), and the value HOLD_TIME[1] indicates that an air/fuel bias is not currently being delivered to the cylinder group 18 (step 110), the jump/hold subroutine 159 is called (step 116). Thus, a phase shift of LAMBSE[1] will only be commenced by the jump/hold subroutine 159 when the EGO_STATE[1] switches state and no air/fuel bias is currently being delivered by LAMBSE[1]. The subroutine 159 will be explained in greater detail hereinafter.

Referring again to step 106, if the value EGO_SWITCH [1] indicates that the signal EGO_STATE[1] has not changed state, and the value HOLD_TIME[1] indicates that air/fuel bias is currently being delivered (step 108), the hold subroutine 345 is called (step 114). Thus, the hold subroutine 345 continues delivering air/fuel bias to the cylinder group 18 until the time period specified by HOLD_TIME[1] has expired.

Alternately, if the value EGO_SWITCH[1] indicates that the signal EGO_STATE[1] has not changed state(step 106), and the value HOLD_TIME[1] indicates that air/fuel bias is not being delivered by LAMBSE[1] (step 108), the ramp subroutine 335 is called (step 112).

Figure 9C:
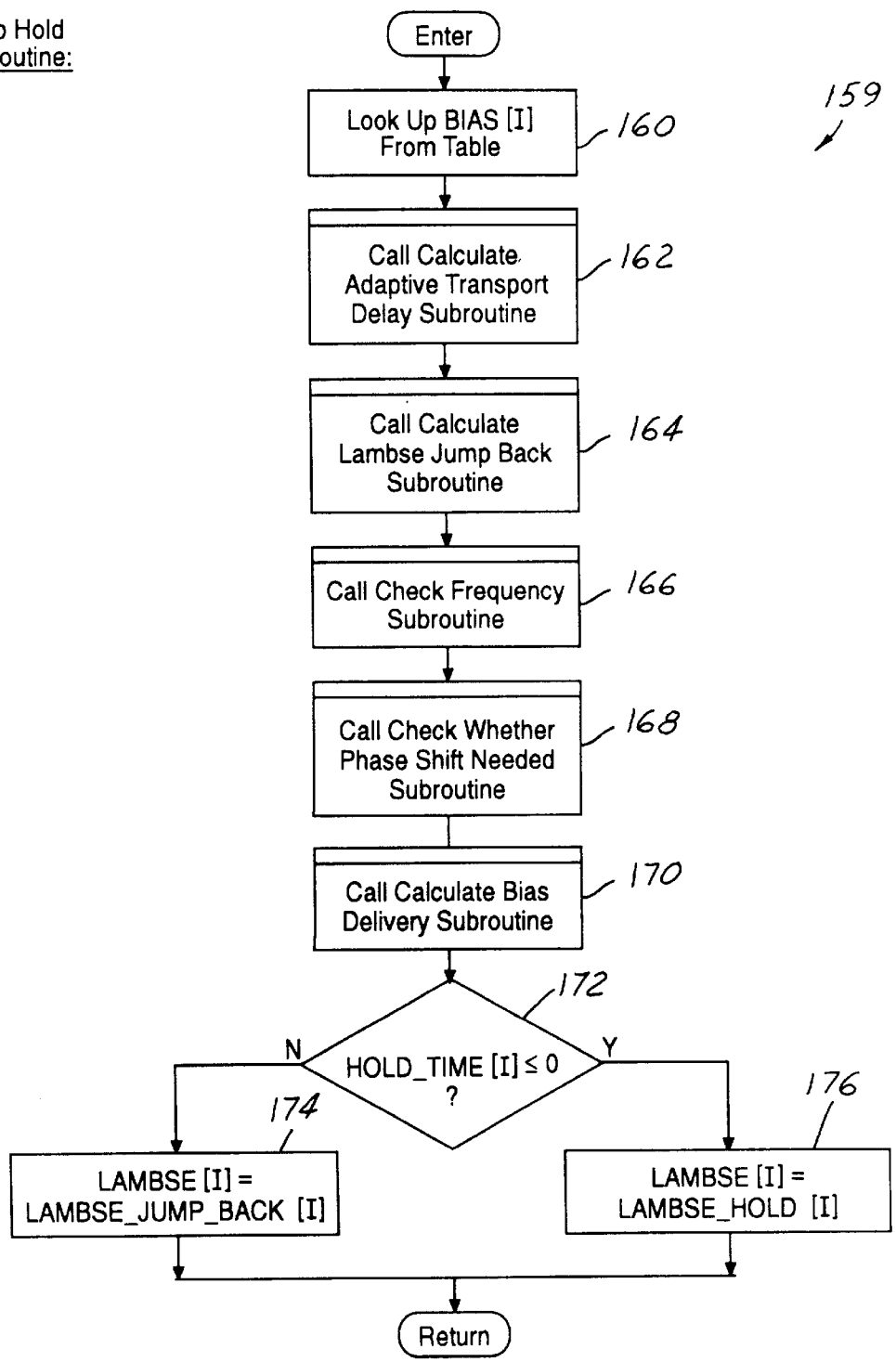

Referring to FIG. 9C, the jump/hold subroutine 159 will now be discussed. The subroutine 159 determines (i) the amount of air/fuel bias (if any) to maintain, (ii) the magnitude of the proportional jump back, and (iii) whether one of the control signals LAMBSE[1] and LAMBSE[2] needs to be phase shifted relative to the other signal. At step 160, the value of BIAS[1] is retrieved from a table stored in the ROM of the controller 58. As previously discussed, the value BIAS[1] represents a desired average air/fuel bias delivered by the signal LAMBSE[1]. At step 162, the subroutine 159 calls the calculate adaptive transport delay subroutine 177.

Figure 9D:
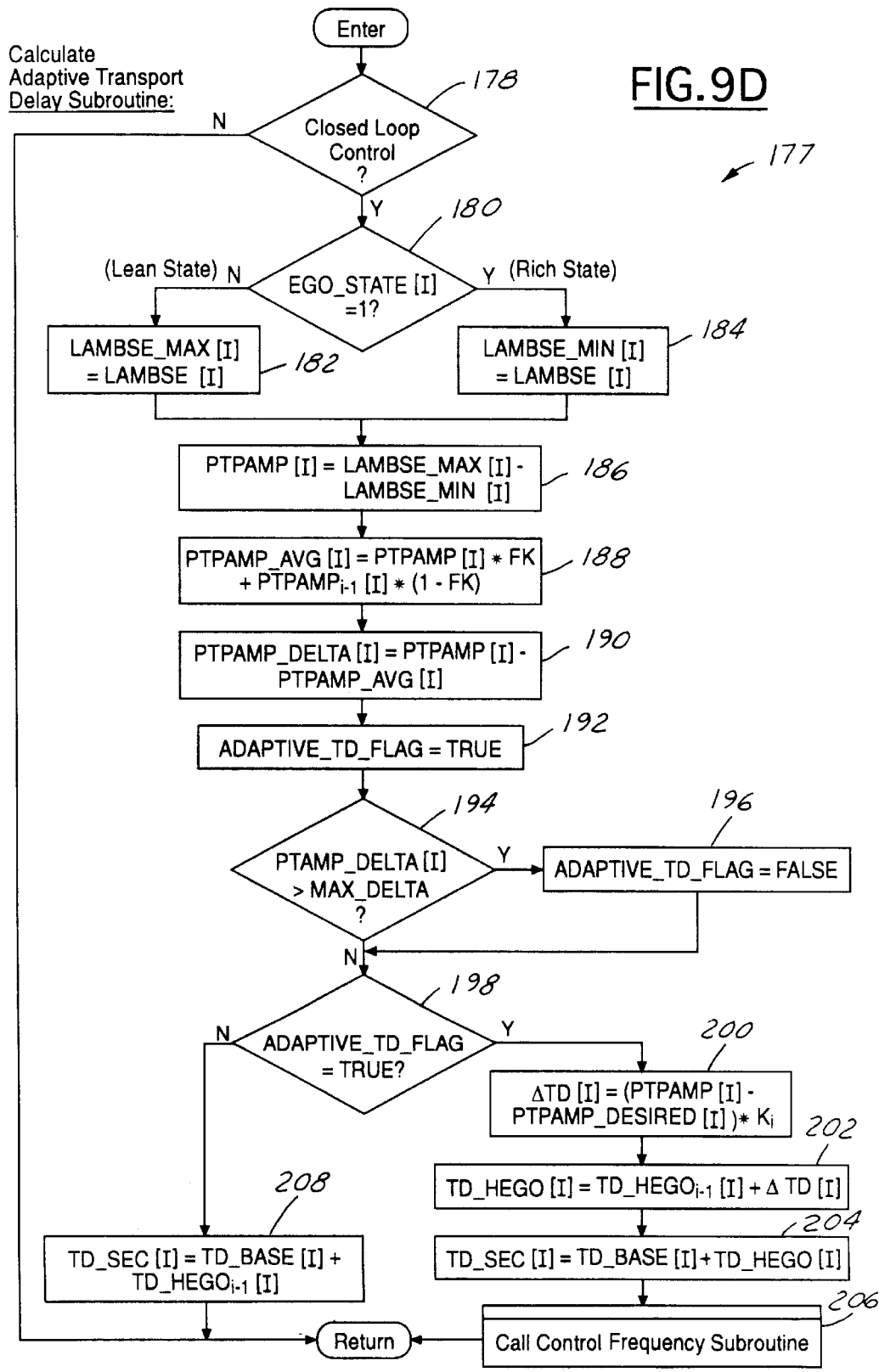

Referring to FIG. 9D, the adaptive transport delay subroutine 177 is provided to calculate a predetermined transport delay TD_SEC[1] that produces a desired peak-to-peak amplitude of the signal LAMBSE[1]. The subroutine 177 is entered at step 178 which determines if closed loop control of the engine 12 is still desired. If closed loop control is desired, the value EGO_STATE[1] is checked to determine if cylinder group 18 has a rich or lean state (step 180). If a lean state exists, the value LAMBSE_MAX[1] is set equal to the present value of LAMBSE[1] (step 182). Alternately, if a rich state exists, the value LAMBSE_MIN[1] is set equal to the present value of LAMBSE[1] (step 184).

The steps 186, 188, 190 are executed to determine the difference between the current peak-to-peak amplitude (i.e., PTPAMP[1]) of LAMBSE[1] and the average peak-to-peak amplitude (i.e., PTPAMP_AVG[1]) of LAMBSE[1]. If the difference is relatively close, a steady state air/fuel ratio operating condition exists. As illustrated, the step 186 calculates the current peak-to-peak value PTPAMP[1]. Next, at step 188 a filtered average value PTAMP_AVG[1] is calculated utilizing the following equation:

$$PTPAMP\_AVG[1]=(PTPTAMP[1]*FK)+(PTPTAMP_{i-1}[1]*(1-FK)),$$

wherein

FK filter constant less than "1"

$PTPAMP_{i-}[1]$=peak-to-peak amplitude of LAMBSE[1] from a prior iteration of subroutine 177.

Next, a value PTPAMP_DELTA[1] is calculated which corresponds to the difference between the current peakto-peak value amplitude of LAMBSE[1] and the average peak-to-peak value LAMBSE[1] (step 190). During a steady state condition of the signal LAMBSE[1], the value PTPAMP_DELTA[1] is relatively small indicating a rather small peak-to-peak deviation of the signal LAMBSE[1]. At step 192, the flag ADAPTIVE_TD_FLAG is initialized.

The step 194, determines if the value PTPAMP DELTA[1] is greater than the value MAX_DELTA (indicating a non-steady-state condition of the amplitude of LAMBSE[1]). The value MAX_DELTA is a threshold value that may be empirically determined. For example, the value MAX_DELTA may be set equal to 0.025. If the value PTPAMP_DELTA[1] is greater than the value MAX_DELTA (indicating a non-steady-state condition of LAMBSE[1]), the ADAPTIVE_TD_FLAG is set equal to a false value (step 196) and then subroutine 177 advances to step 198. If the value PTPAMP_DELTA[1] is not greater than the value MAX_DELTA (indicating a steady state condition of LAMBSE[1]), the subroutine 177 advances to step 198.

The step 198 checks the flag ADAPTIVE_TD_FLAG to determine whether a steady-state condition of the amplitude of signal LAMBSE[1] exists. If a steady state condition exists, the subroutine 177 executes the steps 200, 202, 204 which adjusts the value of the transport delay TD_SEC[1] to ensure a desired peak-to-peak amplitude of LAMBSE[1] is maintained. As illustrated, the step 200 calculates a value ΔTD[1] representing the difference between the current peak-to-peak value of LAMBSE[1] and the desired peak-to-peak value of LAMBSE[1]. As shown, the value ΔTD[1] is calculated utilizing the following equation:

$$\Delta TD[1]=(PTPTAMP[1]-PTPTAMP\_DESIRED[1]*KI;$$

wherein,

PTPAMP_DESIRED[1]=desired peak-to-peak amplitude based upon engine speed and engine load;

KI=gain less than "1"

At step 202, the integral value TD_HEGO[1] is calculated which represents the portion of the transport delay attributed to the response time of the oxygen sensor 52. Next, at step 204, the value TD_SEC[1] is calculated utilizing the following equation:

$$TD\_SEC[1] = TD\_BASE[1] + TD\_HEGO[1];$$

wherein,

TD_BASE[1]=base transport delay

The possible values for the base transport TD_BASE[1] are empirically determined and are stored in a table in the ROM 62 of the controller 58. The table of TD_BASE[1] values are indexed by engine speed and engine load. Thus, the subroutine 177 determines the transport delay TD_SEC[1] responsive to the engine speed and the engine load. After the transport delay TD_SEC[1] is calculated, the subroutine 177 calls a control frequency subroutine 209 (step 206) to control the frequency of the signals LAMBSE[1] and LAMBSE[2].

Referring again to step 194, if the ADAPTIVE_TD_FLAG indicates a non-steady state condition exists, the transport delay TD_SEC[1] is calculated using a value $TD\_HEGO_{i-1}[1]$ determined in a prior iteration of the subroutine 177 (step 208). Thereafter, the subroutine 177 is exited and the subroutine 159 advances to the step 164 illustrated in FIG. 9C.

In an alternate embodiment of engine control routine 93 (not shown), the frequency of the air/fuel ratio oscillations in cylinder groups 18, 20 may be measured values instead of being determined from predetermined values of TD_SEC[1] and TD_SEC[2], respectively. In particular, the frequency of the air/fuel ratio oscillations in the cylinder groups 18, 20 may be determined by measuring the frequency of the signals LAMBSE[1], LAMBSE[2], respectively, or the signals EGO_STATE[1], EGO_STATE[2], respectively. For example, because the frequency of LAMBSE[1] is equal to the frequency (F) of the air/fuel ratio oscillations in cylinder group 18, the following equation may be utilized to calculate F:

$$F = (1/\text{limit cycle of } LAMBSE[1]).$$

Figure 9E:
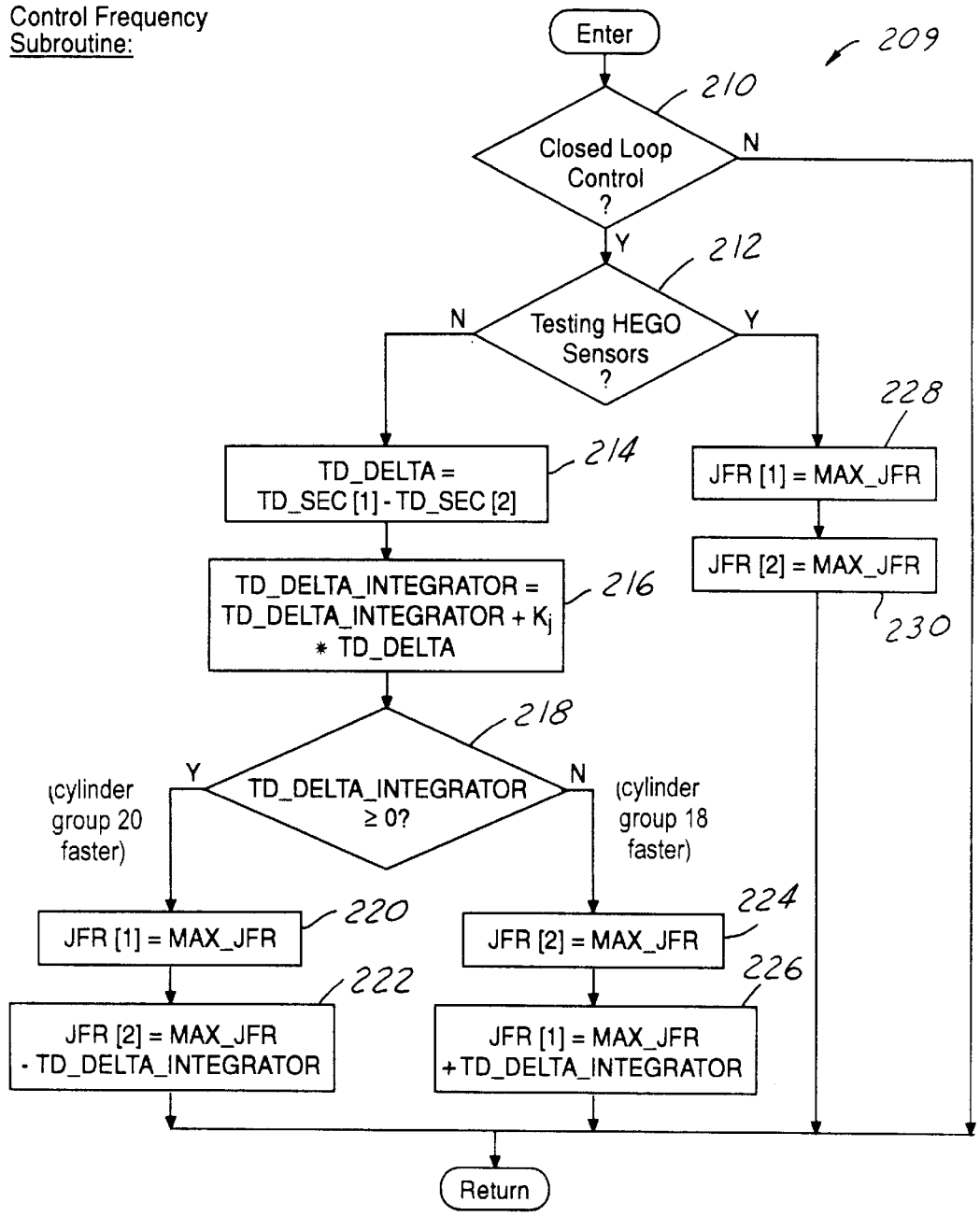

Referring to FIG. 9E, the control frequency subroutine 209—called in step 206 of FIG. 9D—is utilized to move the frequency of one of the control signals LAMBSE[1] and LAMBSE[2] toward the other signal. As a result, the frequency of air/fuel ratio oscillations in the cylinder groups 18, 20 are made substantially equal to one another, prior to phase shifting one of the signals LAMBSE[1] and LAMBSE[2].

As illustrated in FIG. 2A, the jump fraction JFR[1] represents a percentage of the peak-to-peak amplitude PTPAMP[1] of signal LAMBSE[1] and is utilized to calculate the "jump back" value (i.e., delta_lambse[1]) of the signal LAMBSE[1]. Similarly, the jump fraction JFR[2] represents a percentage of the peak-to-peak amplitude PTPAMP[2] of the signal LAMBSE[2] and is utilized to calculate the "jump back" value (i.e., delta_lambse[2]) of the signal LAMBSE[2].

To match the frequencies of the control signals LAMBSE[1] and LAMBSE[2], the subroutine 209 modifies one of the jump fractions JFR[1] and JFR[2], respectively. In particular, the subroutine 209 reduces the jump fraction JFR[1] (and corresponding delta_lambse[I]) of the LAMBSE[I] signal having the greater frequency. As a result, the frequency of the faster LAMBSE[I] signal is decreased. Referring to FIG. 2A at time $T=T_1$, if no frequency matching of LAMBSE[1] and LAMBSE[2] was desired, the value JFR[1] would be set to a desired maximum value and the "jump back" would be from point 80 to point 83. However, because frequency control matching of the signals LAMBSE[1] and LAMBSE[2] is desired in the present invention, and the signal LAMBSE[1] was previously operating at a faster frequency than LAMBSE[2] in this example, the subroutine 209 reduces the jump fraction JFR[1] resulting in a "jump back" from point 80 to point 82. As a result, the actual transport delay TD_SEC[1] of the signal LAMBSE[1] is increased by a time ΔT which decreases the frequency of the signal LAMBSE[1]. Thus, the frequency of the signal LAMBSE[1] is decreased to match the frequency of the signal LAMBSE[2].

Referring to FIG. 9E, the subroutine 209 is entered at step 210 which determines if closed loop control of the engine 12 is desired. If closed loop control is desired, the step 212 determines if oxygen sensors 52, 54 are being tested. Those skilled in the art will recognize that various methodologies may be used to test the degradation of the oxygen sensors 52, 54. However, since the degradation methodologies are not part of the claimed invention, they will not be discussed in any further detail hereinafter. Referring again to step 210, if closed loop control is not desired, the subroutine 209 is exited.

At step 212, if the oxygen sensors 52, 54 are not being tested, the subroutine 209 executes steps 214, 216, 218 to determine whether the signal LAMBSE[1] or the signal LAMBSE[2] has a faster frequency. In particular, at step 214, the value TD_DELTA is calculated utilizing the following equation:

$$TD\_DELTA = TD\_SEC[1] - TD\_SEC[2]$$

The value TD_DELTA corresponds to the difference in the predetermined transport delays TD_SEC[1] and TD_SEC[2].

Next, at step 216, the value TD_DELTA_INTEGRATOR is calculated utilizing the following equation:

$$TD\_DELTA\_INTEGRATOR = TD\_DELTA\_INTEGRATOR + (KJ*TD\_DELTA);$$

wherein

KJ=integration constant less than "1"

It should be noted that the integration constant KJ for calculating TD_DELTA_INTEGRATOR should be less than the constant KI utilized to calculate ΔTD[1] (see FIG. 9D step 200). In particular, the constant KJ should preferably be one tenth of the constant KI (i.e., KJ<=KI/10). The value TD_DELTA_INTEGRATOR increases if the transport delay TD_SEC[1] is greater than the transport delay TD_SEC[2]. In other words, the value TD_DELTA_INTEGRATOR increases if the signal LAMBSE[2] has a faster frequency than LAMBSE[1]. Otherwise, the value TD_DELTA_INTEGRATOR decreases if the signal LAMBSE[1] has a faster frequency than the signal LAMBSE[2]. Further, the value TD_DELTA_INTEGRATOR is limited between the values of 0.3–0.7.

Referring again to step 218, if the signal LAMBSE[2] has a faster frequency than the signal LAMBSE[1], the steps 220 and 222 are executed. In particular, at step 220, the jump fraction value JFR[1] is set to the maximum value MAX_JFR, which may be 0.5, to maintain the frequency of the signal LAMBSE[1]. It should be understood, however, that the value MAX_JFR may be greater than or less than 0.5 depending upon the desired operating conditions of the engine 12. Next, at step 222, the jump fraction value JFR[2]

is decreased to decrease the frequency of the signal LAMBSE[2], using the equation:

$$JFR[2]=MAX\_JFR-TD\_DELTA\_INTEGRATOR$$

Referring again to step 218, if the signal LAMBSE[1] has the faster frequency than the signal LAMBSE[2], the steps 224 and 226 are executed. In particular, at step 224 the jump fraction JFR[2] is set to a maximum value MAX__JFR to maintain the frequency of the signal LAMBSE[2]. Next at step 226, the jump fraction JFR[1] is decreased to decrease the frequency of the signal LAMBSE[1], using the equation:

$$JFR[2]=MAX\_JFR+TD\_DELTA\_INTEGRATOR$$

It should be noted that the value JFR[2] is decreased in the foregoing equation because TD_DELTA_INTEGRATOR is a negative number in this case.

Referring again to step 212, if the oxygen sensors 52, 54 are being tested, the subroutine 209 sets both jump fractions JFR[1] and JFR[2] equal to a maximum value MAX__JFR (steps 228, 230).

After executing any of steps 222, 226, 230, the subroutine 209 is exited and the jump/hold subroutine 159 advances to the step 164 illustrated in FIG. 9C.

Referring to FIG. 9C, at step 164, the jump/hold subroutine 159 calls the calculate lambse jump back subroutine 231 after executing step 162. The subroutine 231 is utilized to calculate desired value of LAMBSE__JUMP__BACK[1], as shown in FIGS. 3A and 4. It should be understood that LAMBSE[1] will be set equal to LAMBSE__JUMP__BACK[1] either (i) immediately after a state transition of EGO__STATE[1], if LAMBSE[1] is not required to deliver air/fuel bias after the transition of EGO__STATE[1], or (ii) after a time interval HOLD__TIME[1] (i.e., bias delivery time) has elapsed from EGO__STATE[1] changing state. For example, referring to FIG. 4 at time $T=T_0$, the signal EGO__STATE[1] (not shown) transitions from a rich to a lean state. In response, the controller 58 sets the signal LAMBSE[1] equal to the value LAMBSE__HOLD[1] to deliver air/fuel bias to cylinder group 18 over the time interval HOLD__TIME[1]. Thereafter, the value of LAMBSE[1] is set equal to the value LAMBSE__JUMP__BACK[1].

Referring to FIG. 9F, the subroutine 231 is entered at step 232 which calculates a value delta_lambse[1] representing the magnitude of the "jump back" of the signal LAMBSE[1]. The value delta_lambse[1] is calculated utilizing the following equation:

$$delta\_lambse[1]=JFR[1]*PTPAMP[1];$$

wherein,

JFR[1]=jump back fraction,
PTPAMP[1]=peak-to-peak amplitude of LAMBSE[1].

Next, at step 234, the value EGO__STATE[1] is checked to determine whether a rich or a lean state exists in the cylinder group 18.

If EGO__STATE[1] indicates a rich state, the step 238 calculates the LAMBSE__JUMP__BACK[1] by adding delta_lambse[1] to the signal LAMBSE[1]. Otherwise when EGO__STATE[1] indicates a lean state, the step 236 calculates the LAMBSE__JUMP__BACK[1] by subtracting delta_lambse[1] from the signal LAMBSE[1]. After either of steps 236 or 238, the subroutine 231 is exited and the jump hold subroutine 159 advances to the step 166 illustrated in FIG. 9C.

Referring to FIG. 9C, at step 166, the jump/hold subroutine 159 calls the check frequency subroutine 239 after executing step 164. The subroutine 239 compares the frequencies of signals LAMBSE[1] and LAMBSE[2] to determine if both frequencies are close enough in frequency for phase shifting one of the signals.

Figure 9G:
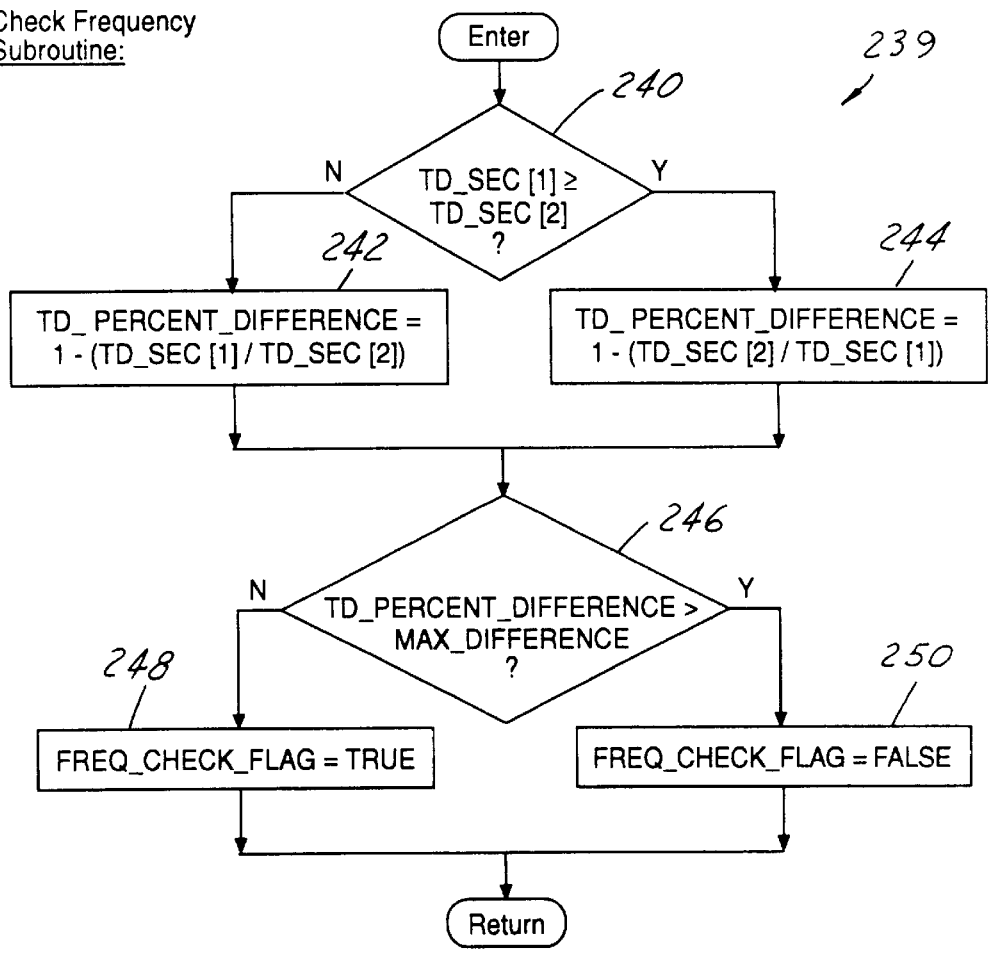

Referring to FIG. 9G, the check frequency subroutine 239 is entered at step 240 which determines whether the signal LAMBSE[1] or the signal LAMBSE[2] has the faster frequency using the transport delays TD__SEC[1] and TD__SEC[2], respectively. In particular, if the signal LAMBSE[2] has a greater frequency than the signal LAMBSE[1] (i.e., TD__SEC[1]>TD__SEC[2]), the step 244 is executed. The step 244 calculates the value TD__PERCENT__DIFFERENCE utilizing the equation:

$$TD\_PERCENT\_DIFFERENCE=1-(TD\_SEC[2]/TD\_SEC[1])$$

The value TD__PERCENT__DIFFERENCE represents the percentage difference between the transport delays TD__SEC[1] and TD__SEC[2].

Referring to again to step 240, if the signal LAMBSE[1] has a greater frequency than the signal LAMBSE[2] (i.e., TD__SEC[1]<TD__SEC[2]), the step 242 is executed. The step 242 calculates the value TD__PERCENT__DIFFERENCE utilizing the equation:

$$TD\_PERCENT\_DIFFERENCE=1-(TD\_SEC[1]/TD\_SEC[2])$$

Next, at step 246, the value TD__PERCENT__DIFFERENCE is compared with the value MAX__DIFFERENCE. The value MAX__DIFFERENCE represents a maximum allowable percentage difference of frequencies of LAMBSE[1] and LAMBSE[2] for which a phase shift is allowed on one of the signals.

Referring again to step 246, if the value TD__PERCENT__DIFFERENCE is greater than the value MAX__DIFFERENCE, the FREQ__CHECK__FLAG is set equal to a false value (step 250). Accordingly, neither of the signals LAMBSE[1] or LAMBSE[2] will be phase shifted with respect to the another signal. Alternately, if the value TD__PERCENT__DIFFERENCE is less than the value MAX__DIFFERENCE (step 246), then the FREQ__CHECK__FLAG is set equal to a true value (step 248). Accordingly, the frequency of signals LAMBSE[1] AND LAMBSE[2] are close enough to justify phase shifting one of the signals. In a preferred embodiment, the value MAX__DIFFERENCE is equal to 20% (e.g., MAX__DIFFERENCE=0.2). Finally, after either of the steps 248, 250, the subroutine 239 is exited and the jump/hold subroutine 159 advances to the step 168 illustrated in FIG. 9C.

Referring to FIG. 9C, at step 168, the jump/hold subroutine calls the check whether phase shift needed subroutine 251, after executing step 166. The subroutine 251 determines the amount of time that the signals EGO__STATE[1] and EGO__STATE[2] (and the air/fuel ratio oscillations in cylinder groups 18, 20, respectively) are in the incorrect phase with respect to one another. Referring to FIG. 3F, for example, when in phase operation is desired and the signals EGO__STATE[1] and EGO__STATE[2] are out of phase (during a limit cycle of EGO__STATE[1]), the subroutine 251 allows a timer EGO__TIMER[1] to increment. Similarly, when out of phase operation is desired and the signals EGO__STATE[1] and EGO__STATE[2] are in phase (during one limit cycle of EGO__STATE[1]), the subroutine 251 increments the timer EGO__TIMER[1]. Thus, the value of EGO__TIMER[1] is indicative of the amount of time that the signals EGO__STATE[1] and EGO__STATE[2] are in the incorrect phase of one another. When the value EGO__TIMER[1] is greater than a threshold value, indicating that one of the LAMBSE[I] signals needs to be phase shifted to maintain a desired phase difference between the signals LAMBSE[1] and LAMBSE[2], a flag DETERMINE_PHASE_DIFF_FLAG is set equal to a true value to subsequently initiate a phase shift.

Figure 9M:
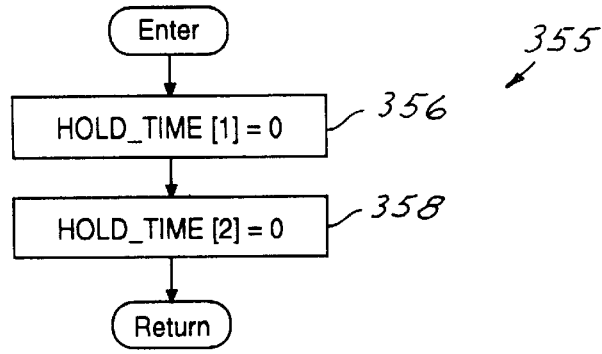
Figure 9H:
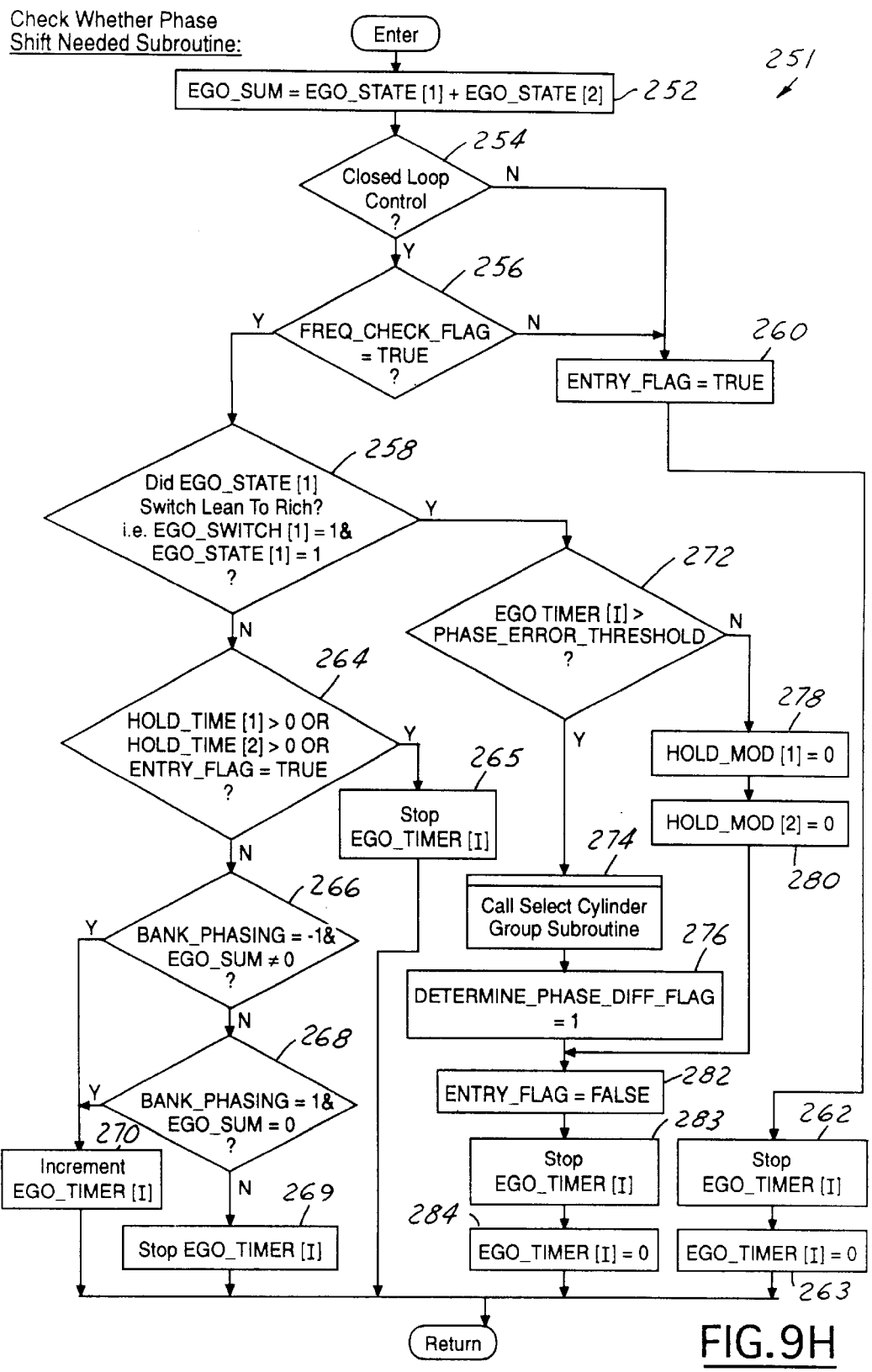

Referring to FIG. 9H, the subroutine 251 is entered at step 252 which determines the signal EGO_SUM. As previously discussed, the signal EGO_SUM is equal to "0" when the signals EGO_STATE[1] and EGO_STATE[2] are out of phase. Further, the signal EGO_SUM is equal to a non-zero value when the signals EGO_STATE[1] and EGO_STATE[2] are in phase.

Next, the steps 254, 256 check for engine operational conditions in which the signals LAMBSE[1] and LAMBSE[2] should not be phase shifted. In particular, if the closed loop operation is not desired (step 254) or the FREQ_CHECK_FLAG equals a false value (step 256), no phase shift should occur. Accordingly, the subroutine 251 advances through steps 260, 262, 263. As illustrated, the step 260 initializes the value ENTRY_FLAG which indicates that subroutine 251 was entered during a prior iteration of engine control routine 93 without a phase shift being performed on one of the signals LAMBSE[1] and LAMBSE[2]. The steps 262, 263 stops the free running timer EGO_TIMER[1] and resets the timer EGO_TIMER[1].

Referring again to step 254, if closed loop control is desired and the flag FREQ_CHECK_FLAG is equal to a true value, the step 258 is executed. The step 258 checks if the EGO_STATE[1] switched from a lean to a rich state. If the signal EGO_STATE[1] did not switch from a lean to a rich state (step 258), the step 264 checks whether the values HOLD_TIME[1] and HOLD_TIME[2] indicate that air/fuel bias is being delivered by either of signals LAMBSE[1] and LAMBSE[2]. If either of signals LAMBSE[1] or LAMBSE[2] are delivering air/fuel bias, the step 265 stops the EGO_TIMER[1] and the subroutine 251 is exited. Thus, EGO TIMER[1] is not incremented during air/fuel bias delivery. Alternately, if neither of signals LAMBSE[1] or LAMBSE[2] are delivering air/fuel bias, the steps 266, 268 are executed. The steps 266, 268 check whether the signals LAMBSE[1] or LAMBSE[2] are in the incorrect phase with respect to one another. If the signals LAMBSE[1] and LAMBSE[2] are in the incorrect phase, the step 270 allows the EGO_TIMER[1] to increment and the subroutine 251 is exited. Alternately, if the signals LAMBSE[1] and LAMBSE[2] are not in the incorrect phase, the step 269 stops the EGO_TIMER[1] and the subroutine 251 is exited. After either of steps 269, 270, the subroutine 251 is exited and the jump/hold subroutine 159 is advanced to the step 170 illustrated in FIG. 9C.

Referring again to step 258, if the signal EGO_STATE[1] did switch from a lean to a rich state, the step 272 determines whether the signal EGO_TIMER[1] is greater than the value PHASE_ERROR_THRESHOLD. If the signal EGO_TIMER[1] is greater than the value PHASE_ERROR_THRESHOLD, the steps 274, 276, 282, 283, 284 are executed.

The step 274 calls the select cylinder group subroutine 285 which selects one of the signals LAMBSE[1] or LAMBSE[2] (and one of the air/fuel ratio oscillations in cylinder groups 18, 20) to phase shift. The subroutine 285 is explained in greater detail hereinbelow.

The step 276 sets the flag DETERMINE_PHASE_DIFF_FLAG equal to "1" so that during a ___subsequent iteration of the engine control routine 93, the determine phase difference subroutine 104 is called to determine the phase difference between the signals LAMBSE[1] and LAMBSE[2]. Further, the value ENTRY_FLAG is set equal to a false value (step 282) and the EGO_TIMER[1] is stopped and reinitialized (steps 283, 284).

Referring again to step 272, if the signal EGO_TIMER[1] is not greater than the value PHASE_ERROR_THRESHOLD, the values HOLD_MOD[1] and HOLD_MOD[2]—for phase shifting LAMBSE[1] and LAMBSE[2] are reset (steps 278, 280). Further, the flag ENTRY_FLAG is set equal to a false value (step 282) and the EGO_TIMER[1] is stopped and reinitialized (steps 283, 284). Thereafter, the subroutine 251 is exited and the jump/hold subroutine 159 is advanced to the step 170 as illustrated in FIG. 9C.

Figure 9I:
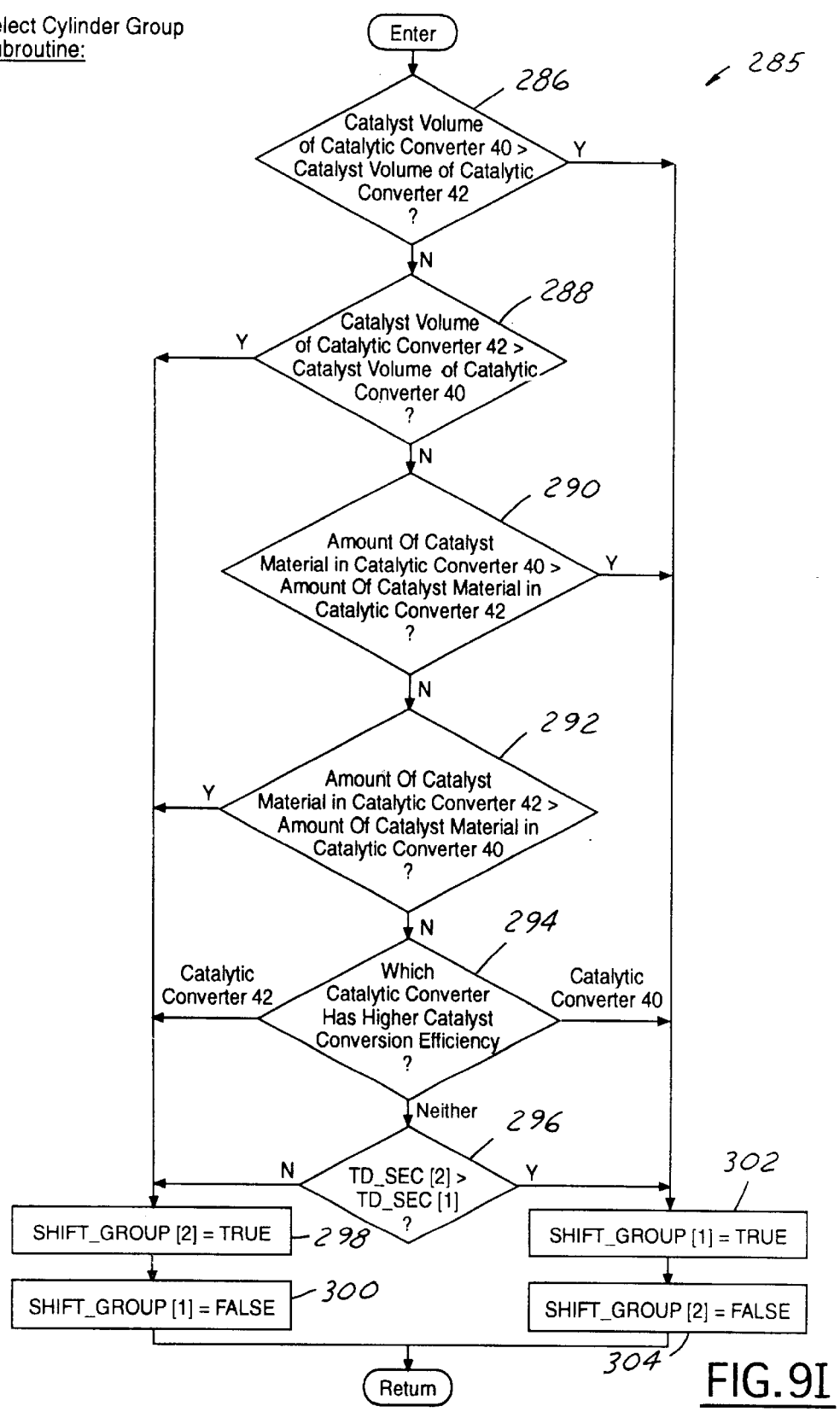

Referring to FIG. 9I, the select cylinder group subroutine 285 called from step 274 (in FIG. 9H) will now be explained. The subroutine 285 is utilized to select one of cylinder groups 18, 20 in which the associated signal LAMBSE[I], controlling the cylinder group, will be phase shifted. As a result of phase shifting one of the signals LAMBSE[I], the air/fuel ratio oscillations in the selected cylinder group will be phase shifted. In particular, the subroutine 285 selects one of cylinder groups 18, 20 communicating with a catalytic converter that is more capable of maintaining reduced emissions during a phase shift of the air/fuel ratio oscillations.

The subroutine 285 first determines whether either catalyst volume of catalytic converters 40, 42 is greater than the other catalyst volume. (steps 286, 288). The inventors herein have recognized that catalytic converter having a larger catalyst volume is more capable of maintaining reduced emissions than a smaller catalytic converter, when phase shifting air/fuel ratio oscillations. Thus, the inventors herein have recognized that the cylinder group communicating with the catalytic converter having a larger catalyst volume should be selected when a phase shift is to be performed on air/fuel ratio oscillations in one of the cylinder groups.

As a result, the inventors herein have recognized that the signal LAMBSE[I] controlling the cylinder group connected to the catalytic converter having a larger catalyst volume should be selected for being phase shifted. As previously discussed, the signals LAMBSE[1] and LAMBSE[2] control the air/fuel ratio oscillations in the cylinder groups 18, 20, respectively which are connected to the catalytic converters 40, 42, respectively. Accordingly, if catalytic converter 40 has a larger catalyst volume than catalytic converter 42, the signal LAMBSE[1] should be selected for being phase shifted (steps 286, 302, 304). In this case, the value SHIFT_GROUP[1] is set equal to a true value, to select the signal LAMBSE[1] for being phase shifted. Alternately, if the catalytic converter 42 has a larger catalyst volume than catalytic converter 40, the signal LAMBSE[2] should be selected for being phase shifted (steps 288, 298, 300). In this case, the value SHIFT_GROUP[2] is set equal to a true value, to select the signal LAMBSE[2] for being phase shifted.

If neither of catalytic converters 40, 42 have a larger catalyst volume (steps 286, 288), the subroutine 285 determines whether one of the catalytic converters 40, 42 has a greater amount of catalyst material than the other of catalytic converters 40, 42 (steps 290, 292). The term "catalyst material" includes known oxidizing and reducing materials utilized in catalytic converters including platinum, palladium, and rhodium, or the like. The inventors herein have recognized that the catalytic converter having a greater amount of catalyst material is more capable of maintaining reduced emissions than a catalytic converter having a lesser amount of catalyst material, when phase shifting air/fuel ratio oscillations. Thus, the inventors herein have recognized that the cylinder group communicating with the catalytic converter having a larger amount of catalyst material should be selected, when a phase shift is to be performed on air/fuel ratio oscillations in one of the cylinder groups.

As a result, the inventors herein have recognized that the signal LAMBSE[I] controlling the cylinder group connected to the catalytic converter having a larger amount of catalyst material, should be selected for being phase shifted. Accordingly, if the catalytic converter 40 has a greater amount of catalyst material than catalytic converter 42, the signal LAMBSE[1] should be selected for being phase shifted (steps 290, 302, 304). Alternately, if the catalytic converter 42 has a greater amount of catalyst material than catalytic converter 40, the signal LAMBSE[2] should be selected for being phase shifted (steps 292, 298, 300).

If neither of catalytic converters 40, 42 have a larger catalyst volume (steps 286, 288) or a greater amount of catalyst material (steps 290, 292), the subroutine 285 checks whether one of the catalytic converters 40, 42 has a greater conversion efficiency (step 294). Those skilled in the art will recognize that there are several conventional methods for determining the conversion efficiency of catalytic converters 40, 42. For example, the efficiency of catalytic converter 40 could be determined by accumulating the number of state transitions ($N_1$) of the signal $V_{EOG1}$ from upstream oxygen sensor 52 and the number of state transitions ($N_3$) of the signal $V_{EOG3}$ from the downstream oxygen sensor 55, over a predetermined time interval. Thereafter, a ratio $N_1/N_3$ can be calculated that is indicative of the catalyst conversion efficiency of converter 40. A more detailed description of a known method for determining the catalyst conversion efficiency of a catalytic converter is described in U.S. Pat. No. 5,353,592, which is incorporated by reference herein in its entirety. It should be further understood that catalyst conversion efficiency may be determined by the main closed-loop fuel routine (not shown).

The inventors herein have recognized that the catalytic converter having a greater conversion efficiency is more capable of maintaining reduced emissions than the more degraded catalytic converter, when phase shifting airfuel ratio oscillations. As a result, the inventors herein have recognized that the signal LAMBSE[I] controlling the cylinder group connected to the catalytic converter having a greater conversion efficiency, should be selected for being phase shifted. Accordingly, if the catalytic converter 40 has a greater conversion efficiency than catalytic converter 42, the signal LAMBSE[1] should be selected for being phase shifted (steps 294, 302, 304). Alternately, if the catalytic converter 42 has a greater conversion efficiency than catalytic converter 40, the signal LAMBSE[2] should be selected for being phase shifted (steps 294, 298, 300).

If neither of catalytic converters 40, 42 have a larger catalyst volume (steps 286, 288) or a greater amount of catalyst material (steps 290, 292) or a greater conversion efficiency (steps 294, 296), the subroutine 285 next determines which of cylinder groups 18, 20 has a faster frequency of air/fuel ratio oscillations (step 296). The inventors herein have recognized that the catalytic converter connected to the cylinder group having a faster frequency of air/fuel ratio oscillations is more capable of maintaining reduced emissions than the other catalytic converter.

Because the frequency of the signals LAMBSE[1] and LAMBSE[2] are indicative of the frequency of air/fuel ratio oscillations in the cylinder groups 40, 42, respectively, the inventors herein have recognized that the faster signal LAMBSE[I] should be selected for being phase shifted. Accordingly, if the signal LAMBSE[1] has a faster frequency, the signal LAMBSE[1] should be selected for being phase shifted (steps 296, 302, 304). Alternately, if the signal LAMBSE[2] has a faster frequency, the signal LAMBSE[2] should be selected for being phase shifted (steps 296, 298, 300).

Those skilled in the art will recognize that the catalyst parameters including (i) the volume of each of catalytic converters 40, 42, and (ii) the amount of catalyst material in converters 40, 42, may be known when the automotive vehicle 10 is originally designed. Thus, the values for each of the catalyst parameters may be stored in the ROM of the controller 58. Accordingly, each of steps 286, 288, 290, 292 may access the values of the respective catalyst parameters to determine whether the respective step condition equals a "Yes" or a "No" value.

As previously discussed, the subroutine/method 285 selects a cylinder group connected to a catalytic converter best capable of maintaining reduced emissions during a change in an engine operational parameter. In the illustrated embodiment, the engine operational parameter was a phase offset between air/fuel ratio oscillations in the cylinder groups 18, 20. It should be understood, however, that the engine operational parameter could alternately be one of (i) a mean air/fuel ratio, (ii) a frequency of air/fuel ratio oscillations, or (iii) a number of enabled cylinders, in one or more cylinder groups.

Referring to FIG. 9C, the jump/hold subroutine 159 calls the calculate bias delivery subroutine 305 (step 170) after executing the step 168. The subroutine 305 determines whether an average air/fuel bias is to be maintained in cylinder group 18 during the current iteration of engine control routine 93, and, if so, further determines the amplitude of the signal LAMBSE[1] to maintain the average air/fuel bias.

Figure 9J:
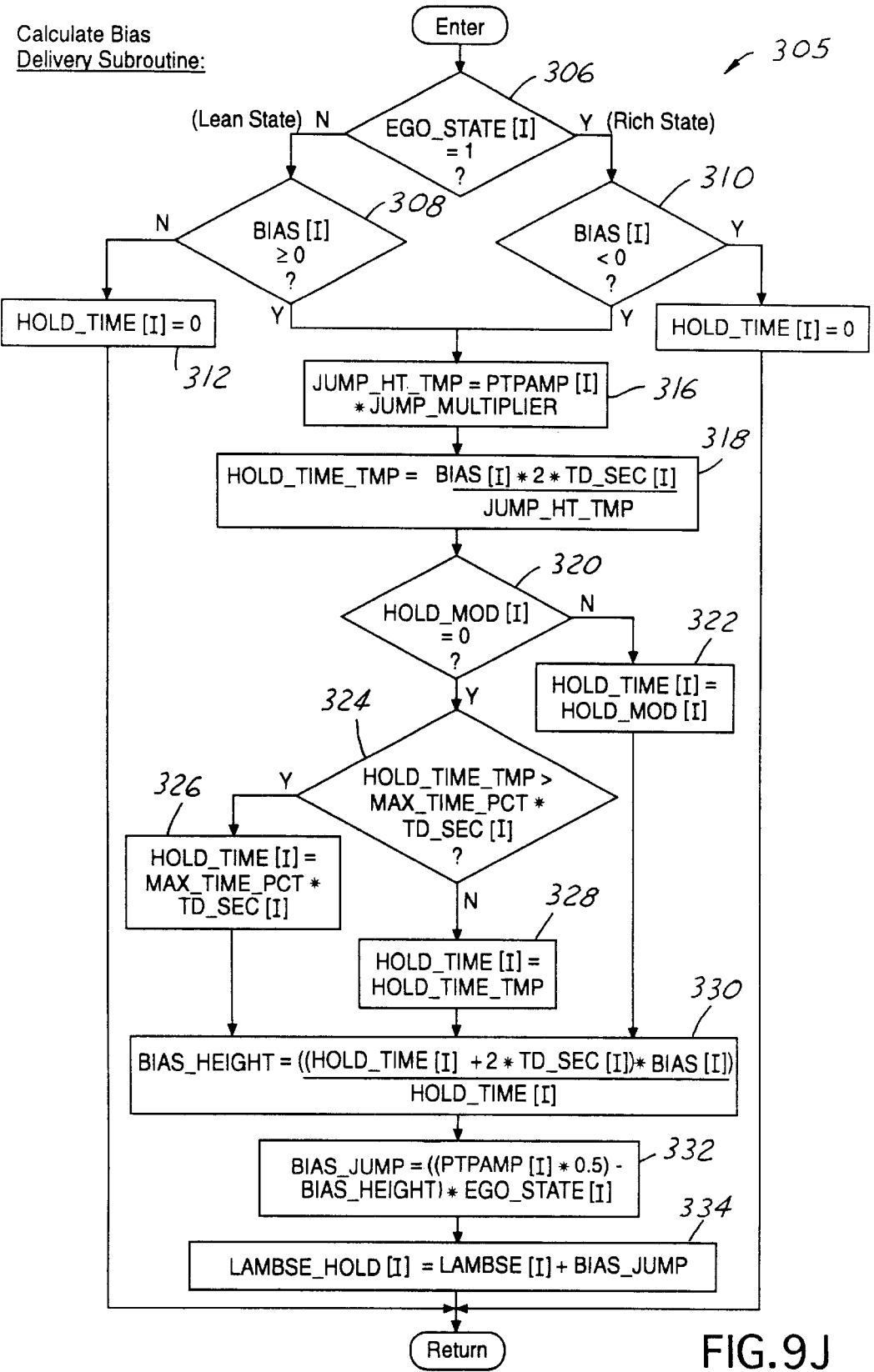

Referring to FIG. 9J, the calculate bias delivery subroutine 305 is entered at step 306 which determines whether the value EGO_STATE[1] indicates a rich state or a lean state in cylinder group 18. If cylinder group 18 has a rich state (step 306) and the desired air/fuel bias is a lean bias (i.e., BIAS[1]>=0 at step 310), the value HOLD_TIME[1] is set equal to zero and the subroutine 305 is exited. In other words, in this case, no air/fuel bias will be delivered to cylinder group 18 during the current iteration of engine control routine 93. Similarly, if the cylinder group 18 has a lean state (step 306) and the desired air/fuel bias is a rich bias (i.e., BIAS[1]<=0 at step 308), the value HOLD_TIME[1] is set equal to zero and the subroutine 305 is also exited.

Alternately, if an air/fuel bias is to be maintained in cylinder group 18 during the current iteration of engine control routine 93 (and subroutine 305), steps 316, 318 calculate.an estimated magnitude of the signal LAMBSE[1] and an estimated hold time needed to deliver the desired air/fuel bias over the limit cycle of LAMBSE[1]. In particular, the step 316 calculates the value JUMP_HT_TMP utilizing the following equation:

JUMP_*HT*_TEMP=*PTP*AMP[1]*JUMP_MULTIPLIER;

wherein,
  JUMP_HT_TEMP=an estimated value of LAMBSE[1] for delivering air/fuel bias,
  PTPAMP[1]=peak-to-peak amplitude of LAMBSE[1],
  JUMP_MULTIPLIER=0.5

Next, the step 318 calculates the value HOLD_TIME_TMP utilizing the following equation:

HOLD_TIME_*TMP*=((BIAS[1]*(2**TD*_SEC[1]))/JUMP_*HT*_*TMP*)

At step 320, the value HOLD_MOD[1] is checked to determine if the signal LAMBSE[1] is to maintain an average air/fuel bias while being phase shifted (e.g., HOLD_MOD[1]>0). If so, the step 322 sets the value HOLD_TIME[1] equal to HOLD_MOD[1] (calculated in the determine phase difference subroutine 119) and the subroutine advances to step 330.

The step 330 calculates the BIAS_HEIGHT utilizing the following equation:

$$BIAS\_HEIGHT=((HOLD\_TIME[1]+(2*TD\_SEC[1]))*BIAS[1])/HOLD\_TIME[1]$$

Referring to FIG. 4, the BIAS_HEIGHT is the amplitude of the signal LAMBSE[1] with respect to stoichiometry, during the phase shift time interval HOLD_TIME[1] that is necessary to maintain the average air/fuel bias (i.e., BIAS[1]) desired over one limit cycle (i.e., limit cycle=HOLD_TIME[1]+(2*TD_SEC[1]) of the signal LAMBSE[1].

Referring to FIG. 9J, at step 332, the value BIAS_JUMP is calculated utilizing the following equation:

$$BIAS\_JUMP=((PTPAMP[1]*0.5)-BIAS\_HEIGHT)*EGOSTATE[1])$$

Referring to FIG. 4, the value BIAS_JUMP is the value that LAMBSE[1] will be "jumped back" to obtain the BIAS_HEIGHT level.

Referring again to FIG. 9J, at step 334, the value LAMBSE_HOLD[1] is calculated utilizing the equation:

$$LAMBSE\_HOLD[1]=LAMBSE[1]+BIAS\_JUMP$$

Referring to FIG. 4, the value LAMBSE_HOLD[1] represents the value of the signal LAMBSE[1] during the time interval HOLD_TIME[1]. Thus, the value LAMBSE_HOLD[1] represents a bias level calculated responsive to the desired average air/fuel bias BIAS[1] and the phase shift hold time HOLD_MOD[1].

Referring again to step 320, if the signal LAMBSE[1] is to maintain an average air/fuel bias in cylinder group 18, while not being phasing shifted (e.g., HOLD_MOD[1]=0), the step 324 is executed. The step 324 determines whether the estimated value HOLD_TIME_TMP (calculated in step 318) is greater than a maximum allowable hold time. The maximum allowable hold time is determined utilizing the following equation:

$$maximum\ allowable\ hold\ time=MAX\_TIME\_PCT*TD\_SEC[1];$$

wherein

MAX_TIME_PCT=a maximum percentage of the transport delay time TD_SEC[1]

At step 324, if the value HOLD_TIME_TMP is greater than the maximum allowable hold time, the step 326 sets the value HOLD_TIME[1] equal to the maximum allowable hold. Otherwise, the step 328 sets the value HOLD_TIME[1] equal to the value HOLD_TIME_TMP. After either of steps 326, 328, the subroutine 305 executes the steps 330, 332, 334, which were previously discussed. After step 334, the subroutine 305 is exited and the jump/hold subroutine 159 advances to the step 172.

Referring to FIG. 9C, the jump/hold subroutine 159 at step 172 determines whether LAMBSE[1] is to supply an air/fuel bias to the cylinder group 18 during the current iteration of engine control routine 93. If LAMBSE[1] is to supply bias (e.g., HOLD_TIME[1]>0), the step 176 sets the signal LAMBSE[1] equal to the value LAMBSE_HOLD[1] (determined in the calculate bias delivery subroutine 305).

Otherwise, the step 174 sets the signal LAMBSE[1] equal to the value LAMBSE_JUMP_BACK[1] (determined in the calculate lambse jump back subroutine 231). After either of steps 174, 176, the subroutine 159 is exited and control is passed to the engine control routine 93.

Referring to FIG. 9M, the reset subroutine will now be explained. As illustrated, the steps 356, 358 are executed to reinitialize the values HOLD_TIME[1] and HOLD_TIME[2], respectively. In other words, the reset subroutine 355 stops air/fuel bias delivery during the subsequent iteration of the engine control routine 93.

Figure 9K:
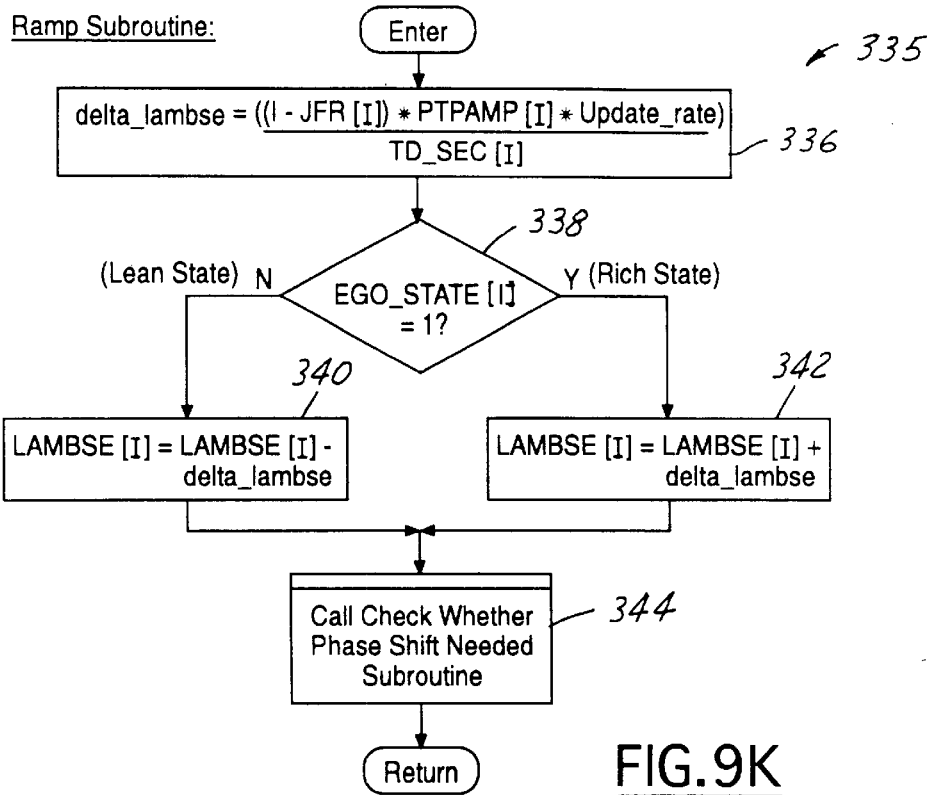

Referring to FIG. 9K, the ramp subroutine 335 will now be explained. The ramp subroutine 355 is entered at step 336 that calculates the value delta_lambse utilizing the following equation:

$$delta\_lambse=((1-JFR[1])*PTPAMP[1]*Update\_rate)/TD\_SEC[1];$$

As previously, discussed, the value Update_rate represents the time interval between iterations of the engine control routine 93. Further, the value delta_lambse represents the incremental step value for adjusting the value of LAMBSE[1] until the signal EGO_SWITCH[1] switches states.

At step 338, the value of EGO_STATE[1] is checked to determine whether EGO_STATE[1] indicates cylinder group 18 has a lean or rich state. If the EGO_STATE[1] indicates a lean state (e.g., EGO_STATE[1]=0), the step 340 calculates LAMBSE[1] utilizing the following equation:

$$LAMBSE[1]=LAMBSE[1]-delta\_lambse$$

Thus, the signal LAMBSE[1] is ramped in a rich direction, with respect to stoichiometry, while.a lean state is measured in the cylinder group 18. Otherwise, if the signal EGO_STATE[1] indicates a rich state (e.g., EGO_STATE[1]=1), the step 342 calculates LAMBSE[1] utilizing the following equation:

$$LAMBSE[1]=LAMBSE[1]+delta\_lambse$$

Thus, the signal LAMBSE[1] is ramped in a lean direction, with respect to stoichiometry, while a rich state is measured in the cylinder group 18.

After either of steps 340 or 342, the step 344 calls the check whether phase shift needed subroutine 251, which was-previously discussed.

Figure 9L:
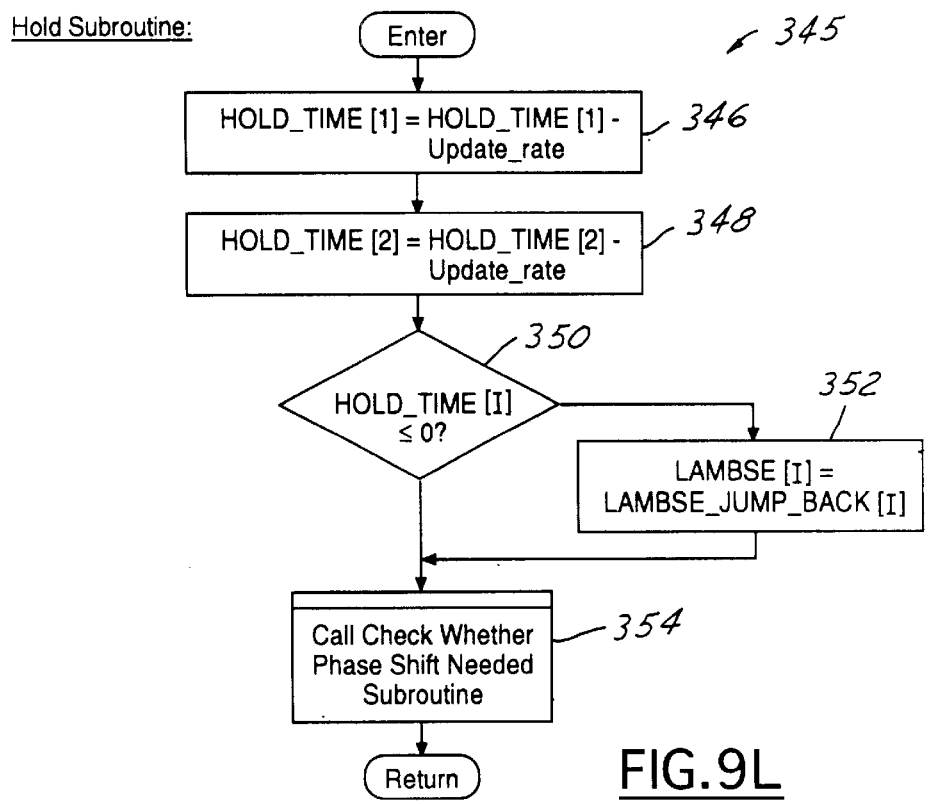

Referring to FIG. 9L, the hold subroutine 345 will now be explained. The hold subroutine 345 is entered at step 346 which decrements the value HOLD_TIME[1]. Next, the step 348 decrements the value HOLD_TIME[2]. Thus, the hold subroutine 345 is decrementing the .hold times HOLD_TIME[1] and HOLD_TIME[2] while an air/fuel bias is being delivered to cylinder groups 18, 20, respectively.

At step 350, when the value HOLD_TIME[1] has elapsed (i.e., HOLD_TIME[1]<=0), the step 352 sets the signal LAMBSE[1] equal to LAMBSE_JUMP_BACK[1] (determined in the calculate lambse jump back subroutine 231). Thus, the signal LAMBSE[1] is jumped back toward stoichiometry after the air/fuel bias delivery has stopped. Otherwise, the signal LAMBSE[1] remains equal to a prior value of LAMBSE[1] and the subroutine 345 advances to the step 354. The step 354 calls the check whether phase shift needed subroutine 251, which was previously discussed.

Referring to FIG. 9A, after the foregoing detailed discussion of the engine control routine 93, one skilled in the art will recognize that the four major tasks are performed when phase shifting one of the signals LAMBSE[1] and LAMBSE[2]. First, the frequency of one of the signals LAMBSE[1] and LAMBSE[2] is moved toward the frequency of the other signal. Second, a phase difference between the signals LAMBSE[1] and LAMBSE[2] is determined. Third, one of the signals LAMBSE[1] and LAMBSE[2] is selected to be phase shifted with respect to the other signal to minimize emissions during the phase shifting. Fourth, while one of the control signals LAMBSE[1] and LAMBSE[2] is phase shifted to a desired phase offset from the other non-shifted control signal.

The inventive method 93 provides a substantial advantage over known engine control methods. In particular, when an engine operational parameter is to be changed, the method 93 selects the cylinder group (and catalytic converter) that is best capable of maintaining reduced emissions during the adjustment of the engine operational parameter.

We claim:

1. A method for selecting one of first and second cylinder groups of an internal combustion engine, said first and second cylinder groups being coupled with first and second catalytic converters, respectively, wherein a first air/fuel ratio in said first cylinder group oscillates about a first predetermined air/fuel ratio, and wherein a second air/fuel ratio in said second cylinder group oscillates about a second predetermined air/fuel ratio, said method comprising:

identifying one of said first and second catalytic converters using first and second catalyst parameters, respectively, associated with said first and second catalytic converters; and, selecting one of said first and second cylinder groups coupled to said identified catalytic converter for phase shifting air/fuel ratio oscillations in said selected group, said selection being made to reduce engine emissions during said phase shift.

2. The method of claim 1 wherein each of said first and second catalyst parameters includes one of a catalyst volume, an amount of catalyst material, and a catalyst conversion efficiency.

3. The method of claim 2 wherein said identifying step includes comparing said first and second catalyst parameters to one another to determine which of said first and second catalytic converters has one of a greater catalyst volume, a greater amount of catalyst material, and a greater conversion efficiency.

4. The method of claim 1 wherein said first and second catalytic converters have three-way catalysts.

5. A method for selecting one of first and second cylinder groups of an internal combustion engine, said first and second cylinder groups being coupled with first and second catalytic converters, respectively, wherein a first air/fuel ratio in said first cylinder group oscillates about a first predetermined air/fuel ratio, and wherein a second air/fuel ratio in said second cylinder group oscillates about a second predetermined air/fuel ratio, said method comprising:

determining whether one of said first and second catalytic converters has a larger catalyst volume using a controller; and, selecting one of said first and second cylinder groups coupled to said catalytic converter having said larger catalyst volume for changing an engine operational parameter in said selected group.

6. The method of claim 5 wherein said engine operational parameter is a phase offset between said first and second air/fuel ratio oscillations in said first and second cylinder groups, respectively.

7. The method of claim 5 wherein said engine operational parameter is a mean air/fuel ratio of said selected cylinder group.

8. The method of claim 5 wherein said engine operational parameter is a frequency of air/fuel ratio oscillations of said selected cylinder group.

9. The method of claim 5 wherein said engine operational parameter is a number of enabled cylinders of said selected cylinder group.

10. A method for selecting one of first and second cylinder groups of an internal combustion engine, said first and second cylinder groups being coupled with first and second catalytic converters, respectively, said method comprising:

determining whether one of said first and second catalytic converters has a greater amount of catalyst material using a controller; and, selecting one of said first and second cylinder groups coupled to said catalytic converter having said larger amount of catalyst material for changing an engine operational parameter in said selected group.

11. The method of claim 10 wherein said engine operational parameter is a phase offset between said first and second air/fuel ratio oscillations in said first and second cylinder groups, respectively.

12. The method of claim 10 wherein said engine operational parameter is one of an average air/fuel ratio of said selected cylinder group, a frequency of air/fuel ratio oscillations in said selected cylinder group, and a number of enabled cylinders of said selected cylinder group.

13. An article of manufacture for selecting one of first and second cylinder groups of an internal combustion engine, said first and second cylinder groups being coupled with first and second catalytic converters, respectively, said article of manufacture comprising:

a computer usable medium; and, a computer readable program code embodied in said medium for identifying one of said first and second catalytic converters using first and second catalyst parameters, respectively, and for selecting one of said first and second cylinder groups coupled to said identified catalytic converter for phase shifting air/fuel ratio oscillations in said selected group, said selection being made to reduce engine emissions during said phase shift.

14. A method for selecting one of first and second cylinder groups of an internal combustion engine, the first and second cylinder groups being coupled to first and second emission control devices, respectively, the method comprising:

indicating when said first catalyst can more efficiently reduce engine emissions compared to said second catalyst based on an catalyst structural parameter, said indication being made by a controller; and, selecting said first cylinder group connected to said first catalyst for changing an engine operational parameter in said selected group, said selection being made to reduce emissions during said change of said engine operational parameter.

15. The method of claim 14 wherein said catalyst structural parameter comprises one of a catalyst volume and an amount of catalyst material.

* * * * *